United States Patent
Okada et al.

(10) Patent No.: US 8,289,393 B2
(45) Date of Patent: Oct. 16, 2012

(54) CAMERA CONTROL UNIT, CAMERA DISPLAY SYSTEM, AND CAMERA CONTROL METHOD

(75) Inventors: Susumu Okada, Kanagawa (JP); Katsuhiro Iwasa, Saga (JP)

(73) Assignee: Panasonic Corporation, Osaka (JP)

( * ) Notice: Subject to any disclaimer, the term of this patent is extended or adjusted under 35 U.S.C. 154(b) by 1171 days.

(21) Appl. No.: 12/130,868

(22) Filed: May 30, 2008

(65) Prior Publication Data

US 2008/0297601 A1  Dec. 4, 2008

(30) Foreign Application Priority Data

May 31, 2007  (JP) ................................ 2007-144785
May 26, 2008  (JP) ................................ 2008-136524

(51) Int. Cl.
- H04N 7/18 (2006.01)
- G06K 9/00 (2006.01)
- G06K 9/48 (2006.01)
- G06K 9/20 (2006.01)

(52) U.S. Cl. ......... 348/159; 382/154; 382/199; 382/282
(58) Field of Classification Search .................... 348/159
See application file for complete search history.

(56) References Cited

U.S. PATENT DOCUMENTS

2003/0210329 A1* 11/2003 Aagaard et al. ............... 348/159
2008/0143842 A1*  6/2008 Gillard et al. .............. 348/218.1

FOREIGN PATENT DOCUMENTS

JP 11-8843  *  1/1999

OTHER PUBLICATIONS

Moriya, T.; Beniyama, F.; Utsugi, K.; Minakawa, T.; Takeda, H.; Ando, K.; , "Multi-camera and multi-projector based seamless live image display system," Multimedia Modelling Conference, 2004. Proceedings. 10th International , vol., no., pp. 265- 272, Jan. 5-7, 2004.*

Shakil, O.; , "An Efficient Video Alignment Approach for Non-Overlapping Sequences with Free Camera Movement," Acoustics, Speech and Signal Processing, 2006. ICASSP 2006 Proceedings. 2006 IEEE International Conference on , vol. 2, no., pp. II, May 14-19, 2006.*

(Continued)

Primary Examiner — Jeffrey R Swearingen
Assistant Examiner — Taylor Elfervig
(74) Attorney, Agent, or Firm — Wenderoth, Lind & Ponack, L.L.P.

(57) ABSTRACT

In order to control a camera, so that when an image is displayed on screens an object being captured does not cross a border between the screens, a camera control unit is provided to included a position information acquisition unit, a capturing area determination unit, an angle of view/capturing direction computation unit, a camera control signal generation unit, and a camera control signal sending unit. The capturing area determination unit sets the capturing area of the camera so that the object does not cross the border between the screens, and that all captured objects are displayed in the screens. The angle of view/capturing direction computation unit computes the angle of view and the capturing direction based on the capturing area. The camera control signal generation unit generates a signal for controlling the camera to conform to the angle of view and the capturing direction.

14 Claims, 21 Drawing Sheets

OTHER PUBLICATIONS

Yoshifumi Nishida et al., "3D Ultrasonic Tagging System for Observing Human Activity", IEEE International Conference on Intelligent Robots and Systems (IROS2003), pp. 785-791, Oct. 2003.

Roger Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, pp. 323-344, Aug. 1987.

Ming-Hsuan Yang et al., "Detecting Faces in Images: A Survey", IEEE Transactions on Pattern Analysis and Machine Intelligence, vol. 24, No. 1, pp. 34-58, Jan. 2002.

Kentaro Toyama et al., "Wallflower: Principles and Practice of Background Maintenance", Seventh International Conference on Computer Vision, pp. 255-261, 1999.

* cited by examiner

CAMERA CONTROL UNIT, CAMERA DISPLAY SYSTEM, AND CAMERA CONTROL METHOD

BACKGROUND OF THE INVENTION

1. Field of the Invention

The present invention relates to a camera control unit that controls the capturing direction, zoom ratio, and so on of a video camera.

2. Description of the Related Art

With the recent spread of IP networks, videophone systems, remote monitoring systems, and the like, in which video and audio captured by cameras is transmitted across an IP network and viewed, are becoming commonplace. Furthermore, fiber-optic networks capable of instantly transmitting high-bandwidth data have also spread over the past several years, and various systems, which utilize such networks for the simultaneous distribution and viewing of images from a plurality of cameras, have appeared. There are even some such systems in which plural cameras are arranged and installed at certain set angles, shooting images across a wide field of view; the images are then displayed in plural remote displays, making it possible to simultaneously view all the images from that wide field of view.

There is, however, a limit to the number of cameras and displays that can be installed, and thus issues such as users desiring to shoot objects outside of the field of view, users desiring to zoom in on objects and shoot them, and so on arise even if plural cameras have been installed. Patent Document 1 (Japanese Unexamined Patent Publication H11-8843), described below, can be given as an example of a scheme that attempts to address these desires.

This related art provides a system in which, rather than using a wide-angle lens, plural cameras are arranged, shooting across a wide field of view at high resolution, the resultant of which is viewed on a plurality of displays, and the zoom ratios of each of the plural cameras are controlled. According to this related art, in a three-camera arrangement, the cameras installed on both sides undergo capturing direction (pan and tilt) control in addition to zoom control. This solves problems that arise when only zoom control is carried out on the plural cameras, such as overlap occurring in regions displayed between screens and the occurrence of regions that cannot be seen due to gaps in the display, and allows the images of plural cameras displayed on plural screens to be viewed seamlessly between those plural screens.

FIG. 19 is a diagram illustrating this related art. The camera control process according to the present related example shall be described with reference to FIG. 19. In FIG. 19, 100-1 to 100-3 indicate cameras, 110 indicates a camera control unit, and 120-1 to 120-3 indicate displays.

When a user manipulates an operational unit 111 to input a value specifying the overall angle of view at which the plural arranged cameras can shoot, an angle of view instruction generation unit 112 calculates the angles of view of each camera by dividing that value specifying the overall angle of view equally by three, and furthermore calculates the capturing directions of the two cameras 100-1 and 100-3 installed on both sides. The calculated angle of view information is passed to a zoom amount control unit 113, while the calculated capturing direction information is passed to a camera direction control unit 114. The zoom amount control unit 113 controls the zoom ratio of the plural cameras so that they take on the specified angle of view. Meanwhile, the camera direction control unit 114 controls the cameras on both sides so that they take on the respective specified capturing directions.

A camera control method of the camera control unit 110 shall be described with reference to FIGS. 20 and 21. FIG. 20 is a diagram illustrating the area being shot by the plural cameras and the appearance of the displays in which those camera images are being displayed. 200-1 to 200-3 indicate cameras, 210 indicates the area being shot by the cameras 200-1 to 200-3, and 220-1 to 220-3 indicate displays.

Here, the angle of view and capturing direction of the camera 200-2 are taken as the reference position. When the user uses the operational unit 111 to instruct an increase in the zoom ratio relative to that reference position, the angle of view instruction generation unit 112 raises the zoom ratios of all cameras together, and also rotates the cameras on both sides so as to draw closer to the capturing direction of the camera in the middle, performing control so that the areas between the cameras 220-1 and 220-2 and the areas between 220-2 and 220-3 do not experience gaps or overlaps in the display. Conversely, when the user uses the operational unit 111 to instruct a decrease the zoom ratio relative to the reference position, the angle of view instruction generation unit 112 lowers the zoom ratios of all cameras together, and also rotates the cameras on both sides so as to distance themselves from the capturing direction of the camera in the middle, performing control so that the areas between the cameras 220-1 and 220-2 and the areas between 220-2 and 220-3 do not experience gaps or overlaps in the display.

As described thus far, when the zoom ratio of plural arranged cameras is changed through user operations, controlling the capturing direction of the cameras in addition to the zoom ratios of the cameras eliminates overlaps and gaps between the plural screens on which the images are displayed, making it possible to display the images seamlessly.

However, if the related art is applied to, for example, a videoconference system such as that illustrated in FIG. 21, which photographs objects 310-1 and 310-2 and transmits the captured images to a remote location, the objects are captured in a manner in which they cross the borders of the plural arranged screens, as illustrated by screens 220-1 to 220-3 in FIG. 21. The result is that even if control can be performed so that the regions displayed on the screens do not experience overlaps and gaps between the plural screens, the object appears to be hidden behind the frame of the screen. This in turn results in visual abnormalities experience by the viewer, in the sense that the object cannot be viewed in detail.

In particular, the recent spread of large-screen displays has led to the appearance of videoconference systems that display objects at life size, giving viewers a high sense of presence, as if the object, which is actually at a remote location, is present before their very eyes. Such videoconference systems demand that objects are captured as close to life size as possible, and thus if a user simply adjusts the zoom ratio so that the entire object is captured without crossing the screen borders, the object will appear too small. Meanwhile, if the zoom ratio is controlled to the widest angle possible, it may not be possible to capture all objects in a manner in which they do not cross the screens.

Furthermore, even if, for example, the user can control the capturing directions of all the cameras in addition to the zoom ratios of the cameras, it is extremely difficult to determine capturing directions and zoom ratios as which all objects can be captured without crossing screen borders while also being shot as close to life size as possible.

SUMMARY OF THE INVENTION

Having been conceived in light of the aforementioned problems, it is an object of the present invention to provide a camera control unit that, when images from a single or plural arranged cameras are displayed on plural displays, can automatically controlling the capturing directions and angles of view so that an object does not cross the borders of the plural displays.

In order to achieve the stated object, the present invention has the following configuration.

A camera control unit according to one aspect of the present invention is a camera control unit for use in a camera image display system that divides an image captured by a camera whose capturing direction and zoom ratio can be controlled and displays the divided image in plural displays arranged in a continuous manner. The camera control unit includes a position information acquisition unit, a capturing area determination unit, an angle of view/capturing direction computation unit, a camera control signal generation unit, and a camera control signal sending unit. The position information acquisition unit acquires geometric position information of one or more objects captured by the camera. The capturing area determination unit sets the capturing area of the camera so that the objects do not cross the border of the plural displays and so that all the captured objects are displayed in the plural displays, based on the geometric position information acquired by the position information acquisition unit. The angle of view/capturing direction computation unit computes the angle of view and capturing direction of the camera based on the capturing area determined by the capturing area determination unit. The camera control signal generation unit generates a camera control signal for controlling the camera to conform to the angle of view and capturing direction computed by the angle of view/capturing direction computation unit. The camera control signal sending unit that sends the camera control signal generated by the camera control signal generation unit to the camera.

A camera image display device according to another aspect of the present invention includes a camera whose capturing direction and zoom ratio can be controlled, a camera control unit according to the first aspect of the present invention, plural displays arranged in a continuous manner, and an image display device for dividing the image from the camera and displaying the divided image in the displays.

A camera control method according to yet another aspect of the present invention is a camera control method for use in a camera image display system that divides an image captured by a camera whose capturing direction and zoom ratio can be controlled and displays the divided image in plural displays arranged in a continuous manner, and comprises the following steps:

a position information acquisition step of acquiring geometric position information of one or more objects captured by the camera;

a capturing area determination step of determining the capturing area of the camera so that the object does not cross the border of the plural displays and so that all the captured objects are displayed in the plural displays, based on the geometric position information acquired in the position information acquisition step;

an angle of view/capturing direction computation step of computing the angle of view and capturing direction of the camera based on the capturing area of the camera determined in the capturing area determination step;

a camera control signal generation step of generating a camera control signal for controlling the camera to conform to the angle of view and capturing direction computed in the angle of view/capturing direction computation step; and a camera control signal sending step of sending the camera control signal generated in the camera control signal generation step to the camera.

According to the present invention, when images from a single or plural arranged cameras are displayed on plural displays, the capturing directions and angles of view can be automatically controlled so that a captured object does not cross the borders of the plural displays, making it possible to eliminate visual abnormalities in the images arising due to the object crossing the borders of plural screens.

DETAILED DESCRIPTION OF THE INVENTION

The essence of the present invention is controlling the capturing directions and angles of view of a single or plural cameras so that an object does not cross the borders of plural displays, based on the geometric arrangement of the camera/cameras and the plural displays, and positional information of the object captured by the camera/cameras.

Hereinafter, embodiments of the present invention shall be described in detail with reference to the appended drawings. Note that the example given here describes a case where a camera control unit according to the present invention is applied in a videoconference system.

First Embodiment

Figure 1:
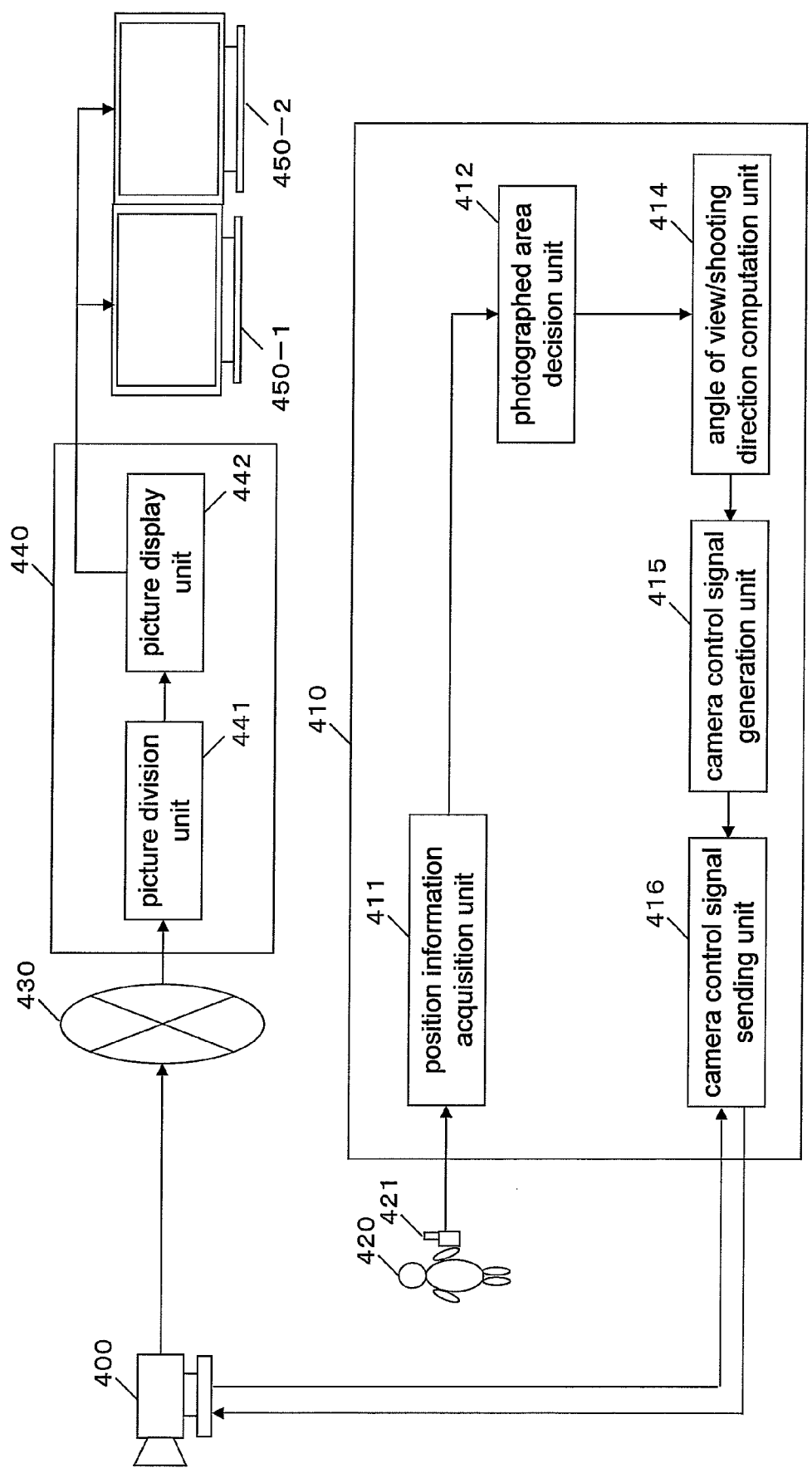
FIG. 1 is a block diagram illustrating a videoconference system according to a first embodiment of the present invention.

FIG. 1 is a block diagram illustrating the main configuration of a videoconference system according to a first embodiment of the present invention.

The videoconference system according to the present embodiment is configured of a camera 400 that photographs a person; a camera control unit 410; an object 420, which is the subject to be captured; a network 430; an image display device 440, which receives images via the network 430 and displays the images in a display; and plural screens 450-1 to 450-2. The camera control unit 410 includes a position information acquisition unit 411, a capturing area determination unit 412, an angle of view/capturing direction computation unit 414, a camera control signal generation unit 415, and a camera control signal sending unit 416. The object 420 has a position information emittance device 421 that is used to detect the position of the object.

An image captured by the camera 400 is transmitted to the image display device 440 via the network 430. The image display device 440 includes a division unit 441 and an imaged display unit 442, and the image division unit 441 divides the received image captured by the camera 400 into the same number of parts as there are screens, and the image display unit 442 displays the divided image in the plural screens 450-1 and 450-2. If the aspect ratio of the plural screens that are arranged and the camera image do not match, the top and bottom or left and right of the camera image are cropped at the time of the division, or the image is enlarged or reduced and then divided, after which the image is displayed. Note that there are various methods by which the image division unit 441 can divide the image captured by the camera 400, and no particular limitation is placed thereon in the present embodiment.

Hereinafter, the control process by which the camera control unit 410 controls the camera 400 shall be described using FIG. 1.

The position information acquisition unit 411 acquires the position information emitted by the position information emittance device 421. The position information emittance device 421 may be any sort of wireless tag by which the position information can be detected, such as a GPS (Global Positioning System) tag, an RFID (Radio Frequency Identification) tag, a wireless LAN tag, or the like; however, it is preferable to use a tag that allows for highly-accurate location detection. A three-dimensional ultrasonic tagging system such as that described in Non-Patent Document 1 (Y. Nishida, H. Aizawa, T. Hori, N. H. Hoffman, T. Kanade, M. Kakikura, "3D Ultrasonic Tagging System for Observing Human Activity," in Proceedings of IEEE International Conference on Intelligent Robots and Systems (IROS2003), pp. 785-791, October 2003 (Las Vegas, USA)) can be given as an example. With this system, ultrasonic waves are emitted from a tag, serving as a transmitter, and the waves are received by three or more receivers; the distance between the tag and the respective receivers is calculated using differences in the time required for the ultrasonic waves to arrive at each receiver, identifying the three-dimensional position of the tag. In this case, the position information acquisition unit 411 acquires the time required for the ultrasonic waves to arrive from each of the receivers, and the position information emittance device 421 calculates the three-dimensional position. Such an example can be found in the aforementioned Non-Patent Document 1.

Figure 2:
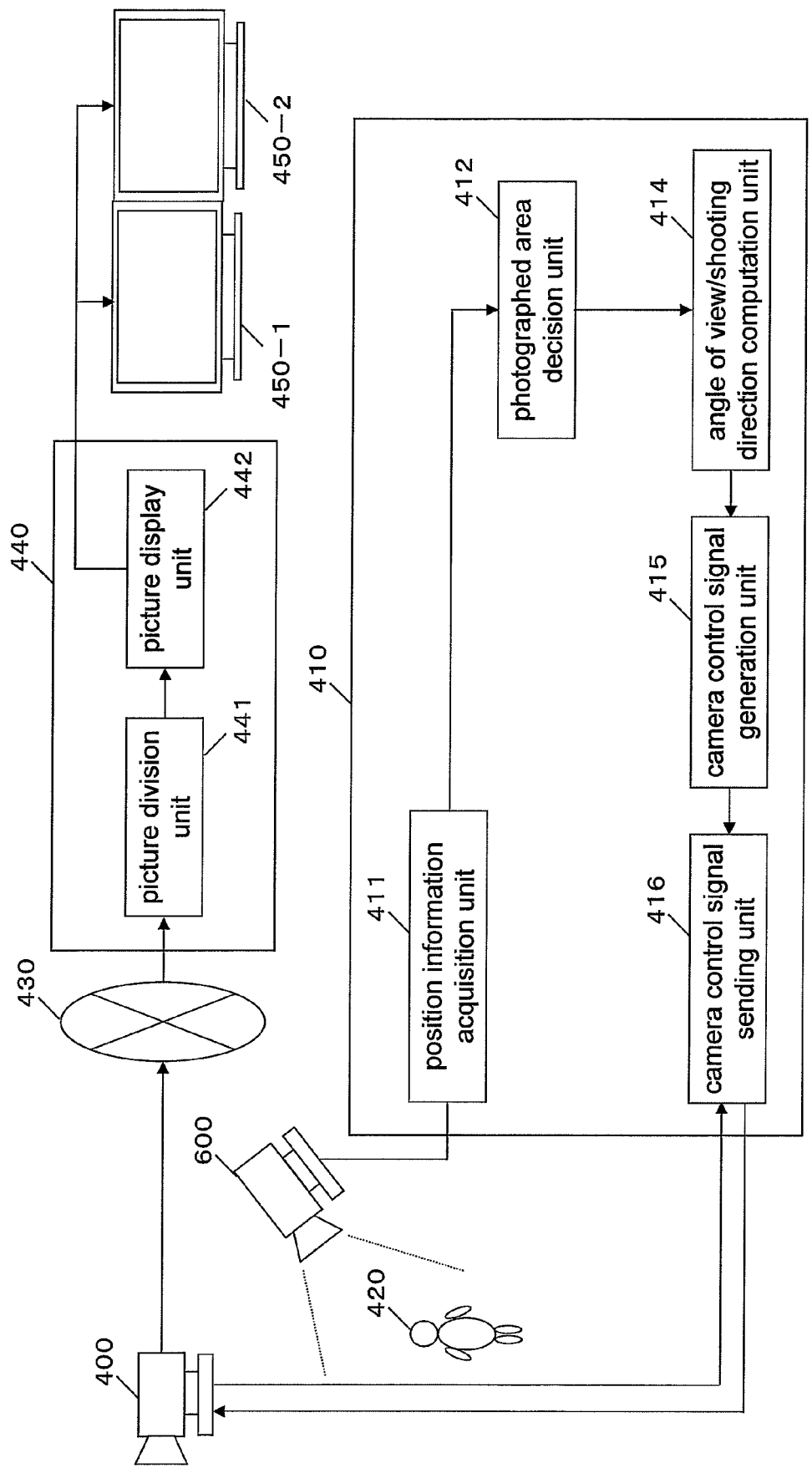
FIG. 2 is a block diagram illustrating a videoconference system serving as a variation of the first embodiment.

Alternatively, a method such as that illustrated in FIG. 2, in which a camera 600 capable of shooting across a wide field of view is installed, the object 420 is detected using image recognition technology, and geometric position information of the detected object 420 is computed, may be utilized instead of a tag for position detection without problems. The position information acquisition unit 411 illustrated in FIG. 2 converts the position of the object within the camera image as detected through the image recognition technology into geometric position information of the space captured by the camera 400. A method such as that described in, for example, Non-Patent Document 2 (R. Y. Tsai, "A Versatile Camera Calibration Technique for High-Accuracy 3D Machine Vision Metrology Using Off-the-shelf TV Cameras and Lenses", IEEE Journal of Robotics and Automation, Vol. RA-3, No. 4, pp. 323-344, August 1987) may be used as the specific conversion method.

When the position information acquisition unit 411 finishes computing the three-dimensional position of the position information emittance device 421, it passes the three-dimensional position information to the capturing area determination unit 412.

Figure 3:
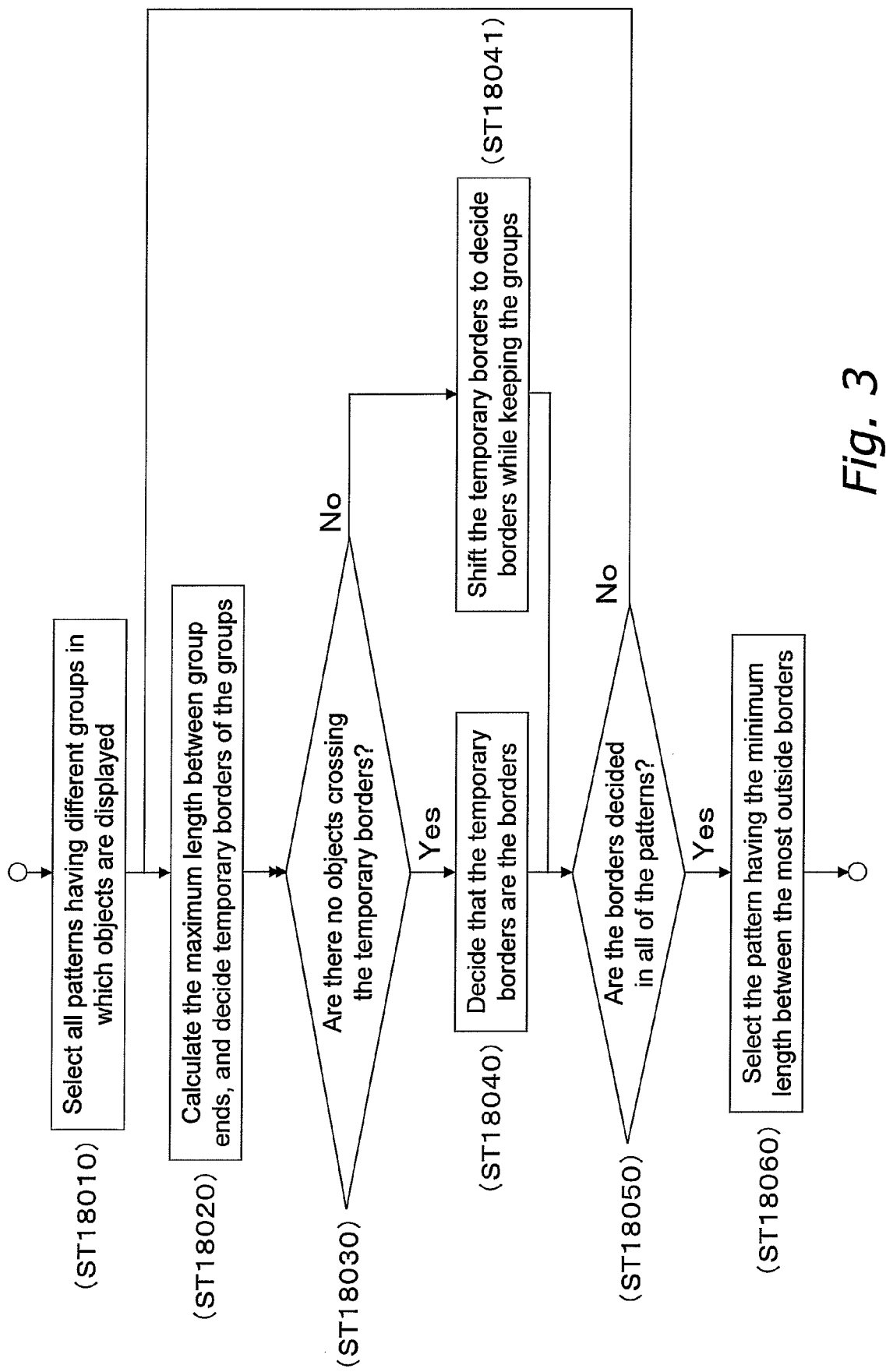
FIG. 3 is a flowchart illustrating a procedure by which a capturing area determination unit determines a shooting range.

A procedure by which the capturing area determination unit 412 determines the shooting range of the camera 400 shall be described with reference to FIG. 3.

Here, it is assumed that the capturing area determination unit 412 is already aware of the number of screens in which the image display unit 442 displays images. Upon acquiring the number of objects 420 and the position of each object 420 from the position information acquisition unit 411, the capturing area determination unit 412 selects all patterns, in which the various objects are displayed in the various screens, that can potentially be displayed (ST18010).

To be more specific, the capturing area determination unit 412 takes plural objects displayed in a single screen as a group, and selects all patterns in which the objects can be grouped based on their positions. An example of this grouping shall be described using FIG. 4. Assuming that there are three screens, and that there are five objects, or objects 1911 to 1915, that are to be captured, this grouping can be carried out so as to result in the groups indicated by 1921 to 1923, as shown in FIG. 4, for example.

If n is the number of screens and r is the number of objects, the number of ways in which the groups can be formed can be expressed by Equation 1, taking into consideration cases where not even one object is displayed on the screens.

$$(n+r)C_n \qquad \text{[Equation 1]}$$

Figure 4:
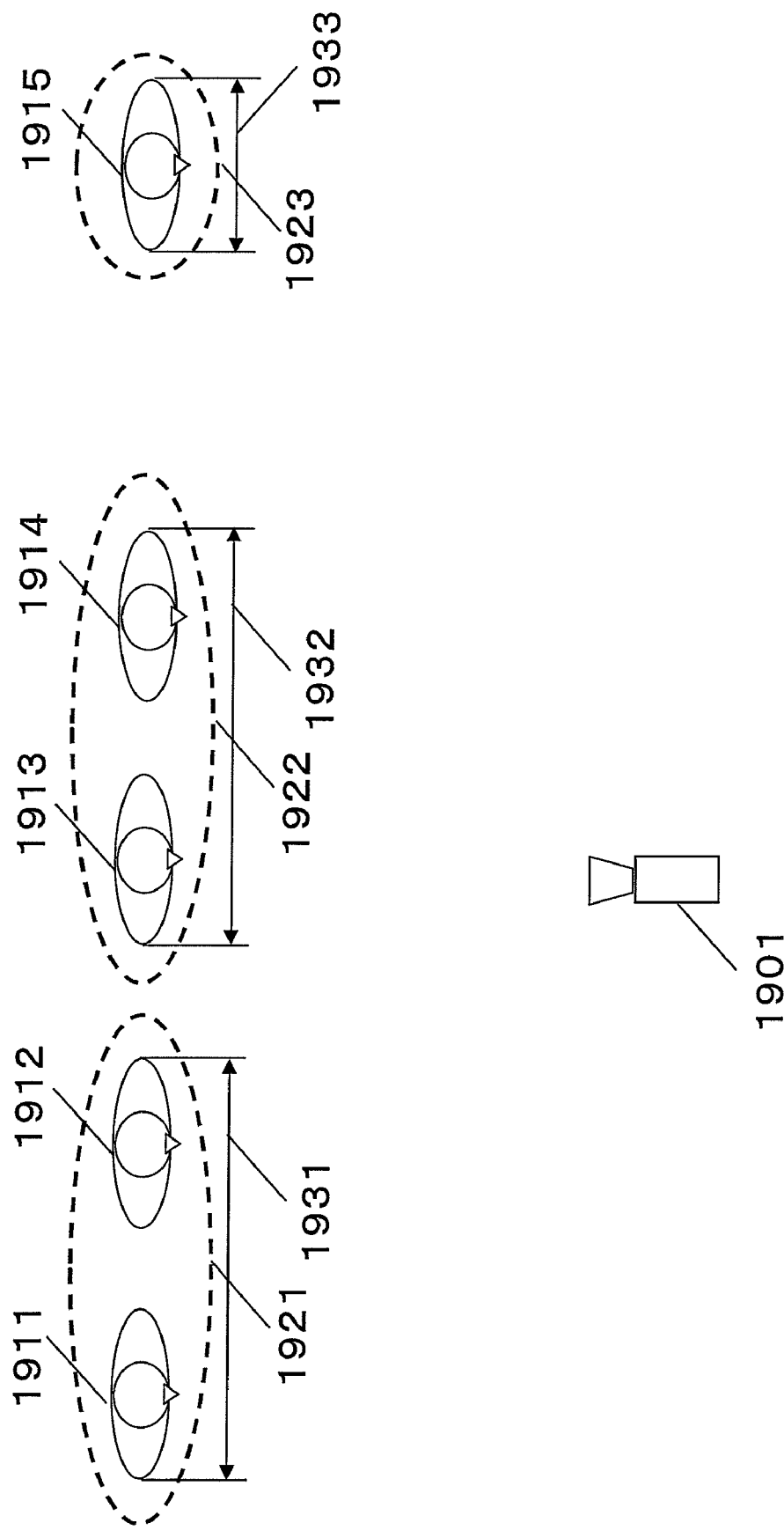
FIG. 4 is a schematic diagram illustrating an example in which plural objects appearing in a single screen are handled as a single group.

The capturing area determination unit 412 selects a single way of dividing the objects into groups from among those found using Equation 1, and then calculates the end-to-end distance of the groups (group lengths) relative to the camera 1901, as indicated by 1931 to 1933 in FIG. 4. In the case where only one object is present in a group, the width of the object is set as the group length, as indicated by the group length 1933 of the group 1932. It is assumed that the capturing area determination unit 412 is already aware of the width of the objects. Furthermore, if not even one object is present within a group, that group length is taken as 0. The capturing area determination unit 412 compares the calculated end-to-end distances of the computer groups and holds the maximum distance value. The position of border lines for the selected way of dividing the objects into groups is determined based on this maximum value (ST18020).

Figure 5:
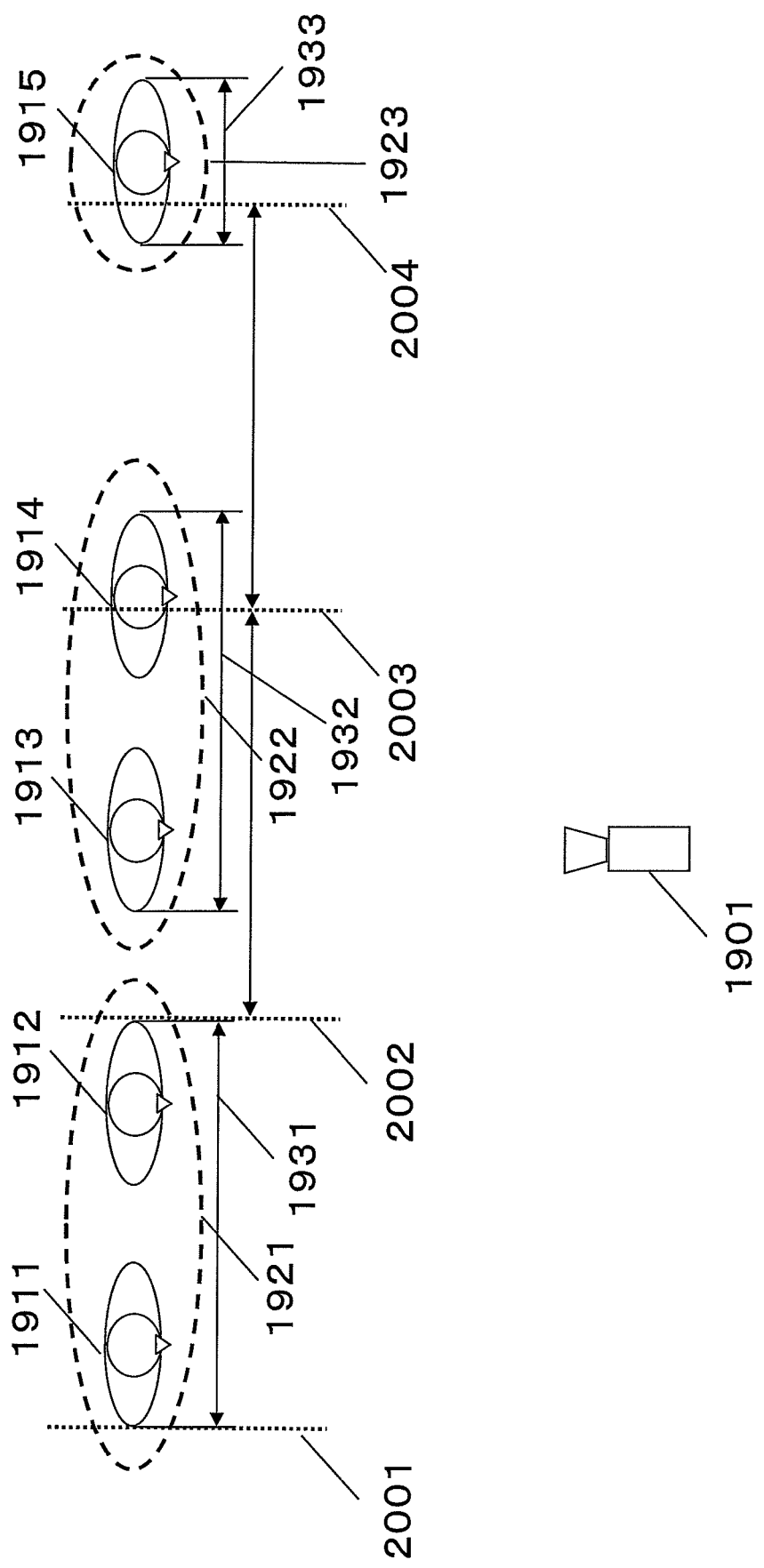
FIG. 5 is a schematic diagram illustrating a method for determining the position of a border line.

A method for determining the position of border lines shall be described using FIG. 5. It is assumed, in the present embodiment, that the group length 1931 has the longest end-to-end distance among the group lengths 1931 to 1933 shown in FIG. 5. At this time, temporary border lines 2001 and 2002 are set at the ends of the group 1921. Then, a temporary border line 2003 is set at a position found by moving, from the border line 2002 and in the direction of the group 1922, the same amount of distance as indicated by the group length 1931. Furthermore, a temporary border line 2004 is set at a position found by moving, from the temporary border line 2003 and in the direction of the group 1923, the same amount of distance as indicated by the group length 1931.

When the setting of the temporary border lines 2001 to 2004 is complete, it is checked whether or not any one of the objects 1911 to 1915 crosses any one of those temporary border lines (ST18030). Checking whether or not any of the objects 1911 to 1915 crosses any one of the temporary border lines is carried out by judging whether or not the temporary border lines 2001 to 2004 are all located between the groups 1921 to 1923. In the case where the temporary border lines 2001 to 2004 are all located between the groups 1921 to 1923, the border line positions for the selected way of dividing the objects into groups 1921 to 1923 are set at the positions indicated by 2001 to 2004 (ST18040).

In the case where even one of the temporary border lines 2001 to 2004 is not located between the groups 1921 to 1923, the border line positions for the border lines not located between groups are set by shifting those border lines so that they are located between groups (ST18041). The result is that the object to be captured does not cross the border positions of screens.

Figure 6:
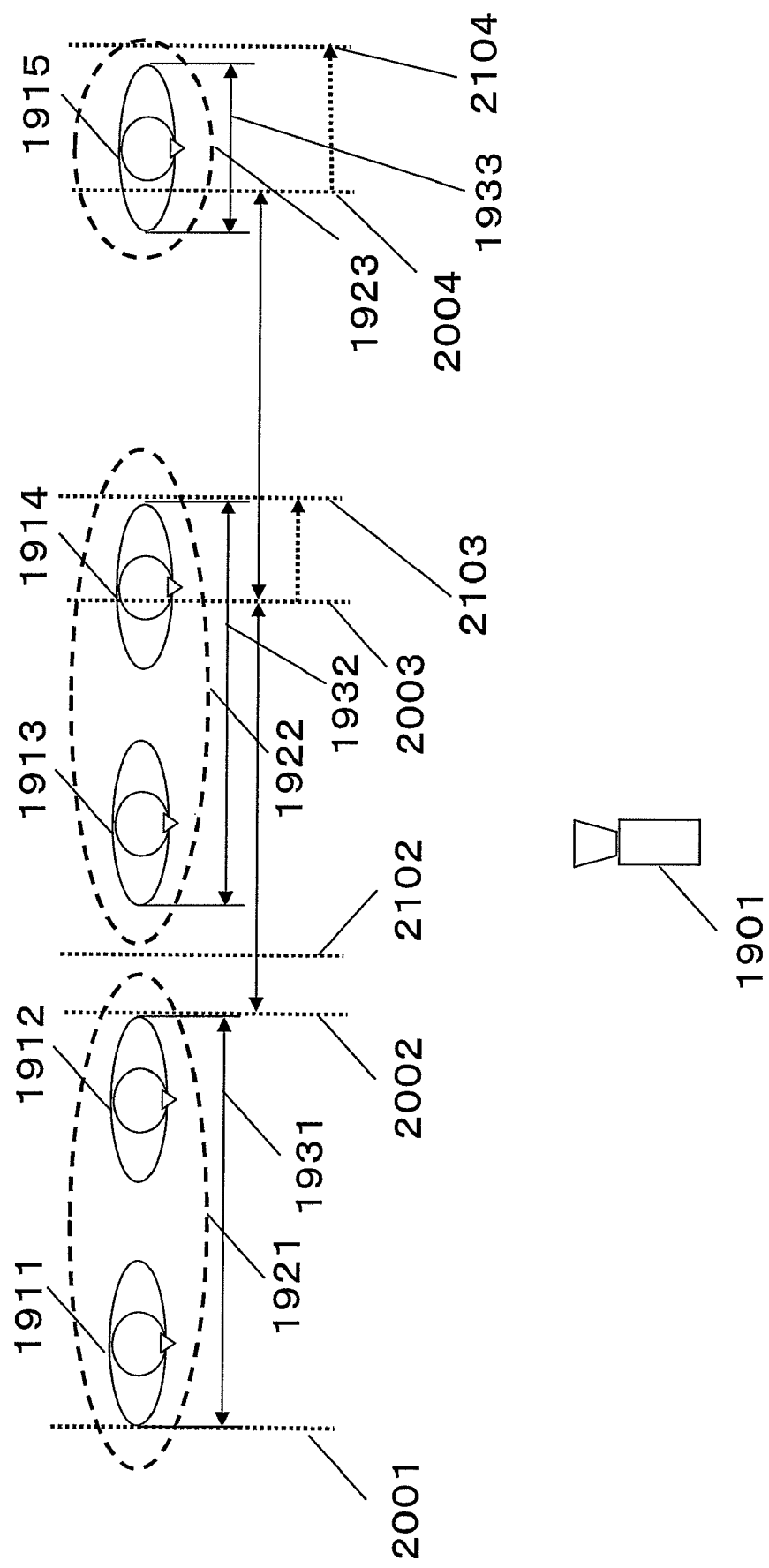
FIG. 6 is a schematic diagram illustrating a method for shifting a border line between groups.

A method for shifting the border lines so that they are located between groups shall be described in detail hereinafter, using FIG. 6. The temporary border line 2003 is located on the group 1922. This temporary border line 2003 is moved to the end of the furthest object belonging to the group 1922, which is the object 1914, and is re-set to be a temporary border line 2103. Next, the temporary border line 2002 is moved by half the amount by which the re-set temporary border line 2003 was moved to the border line 2103, and is re-set to be a temporary border line 2102. At this time, it is checked whether or not the re-set temporary border line 2102 is within the group 1922. In the case where the re-set temporary border line 2102 is not within the group 1922, the re-set temporary border line 2102 is set as the border line of the plural displays. In the case, however, where the re-set temporary border line 2102 is within the group 1922, the re-set temporary border line 2102 is shifted back to the outside of the group 1922; furthermore, the temporary border line 2001 is moved so that the distance between the temporary border lines 2001 and 2102 is the same as the distance between the temporary border lines 2102 and 2103.

In the same manner, the temporary border line 2004 is moved so that the distance between the temporary border lines 2102 and 2103 is the same as the distance between the temporary border lines 2103 and 2004, and is set as a border line 2104 for the plural displays. The border line positions are thus set in this manner. After the border line positions have been set, the capturing area determination unit 412 stores the distances between the border lines.

The capturing area determination unit 412 determines the border line positions for all of the group patterns (ST18050). Once the border line positions have been determined for all patterns, the capturing area determination unit 412 compares the patterns with respect to the distances between border lines for the maximum zoom level at which the objects can be captured. The capturing area determination unit 412 sets the pattern with the minimum distance as the way of dividing the objects into groups to be used during shooting, and sets the border line positions of that pattern as the borders of the screens (ST18060).

When the grouping pattern has been determined, the capturing area determination unit 412 determines the capturing area by referring to the two border lines on the extreme right and left of the determined border lines, and passes the capturing area information to the angle of view/capturing direction computation unit 414. The angle of view/capturing direction computation unit 414 calculates the capturing direction and angle of view of the camera based on the capturing area information and the camera position. To find the angle of view of the camera, first, the two points at which a straight line passing through the averaged row of the objects are present intersects with the border lines on the extreme right and left ends are calculated. The angle of view of the camera can then be calculated by finding, based on the results of the above calculation, the angle formed by the two line segments that connect the intersecting points with the coordinates of the position at which the camera is installed. Meanwhile, the capturing direction of the camera can be calculated by referring to the angle of the central direction of the calculated angle of view of the camera relative to the forward direction of the camera.

The camera control signal generation unit 415 takes the angle of view and the capturing direction information of the camera 400 as calculated by the angle of view/capturing direction computation unit 414 and converts these into a signal capable of controlling the camera 400. Meanwhile, the camera control signal sending unit 416 receives the camera control signal generated by the camera control signal generation unit 415 and sends it to the camera 400.

The above-described operations make it possible to control the capturing direction of a camera so that objects do not cross the borders of plural displays. It should be noted that although FIGS. 4 through 6 in the present embodiment depict the camera 1901 and the objects 1911 to 1915 as viewed from above, the method for arranging the displays is not intended to be limited to a case where the displays are arranged in the display vertical direction. In the case where the plural displays are arranged in the display vertical direction rather than in the display horizontal direction, an axis spanning from the ground in the upward direction is newly provided, and it can then be determined whether or not the objects 1911 to 1915 cross the borders of the vertically-arranged displays in the same manner as described above, based on the height of the camera 1901 and the heights of the objects 1911 to 1915. Furthermore, the plural displays may be arranged both in the horizontal and vertical directions of the displays.

(First Variation)

Figure 7:
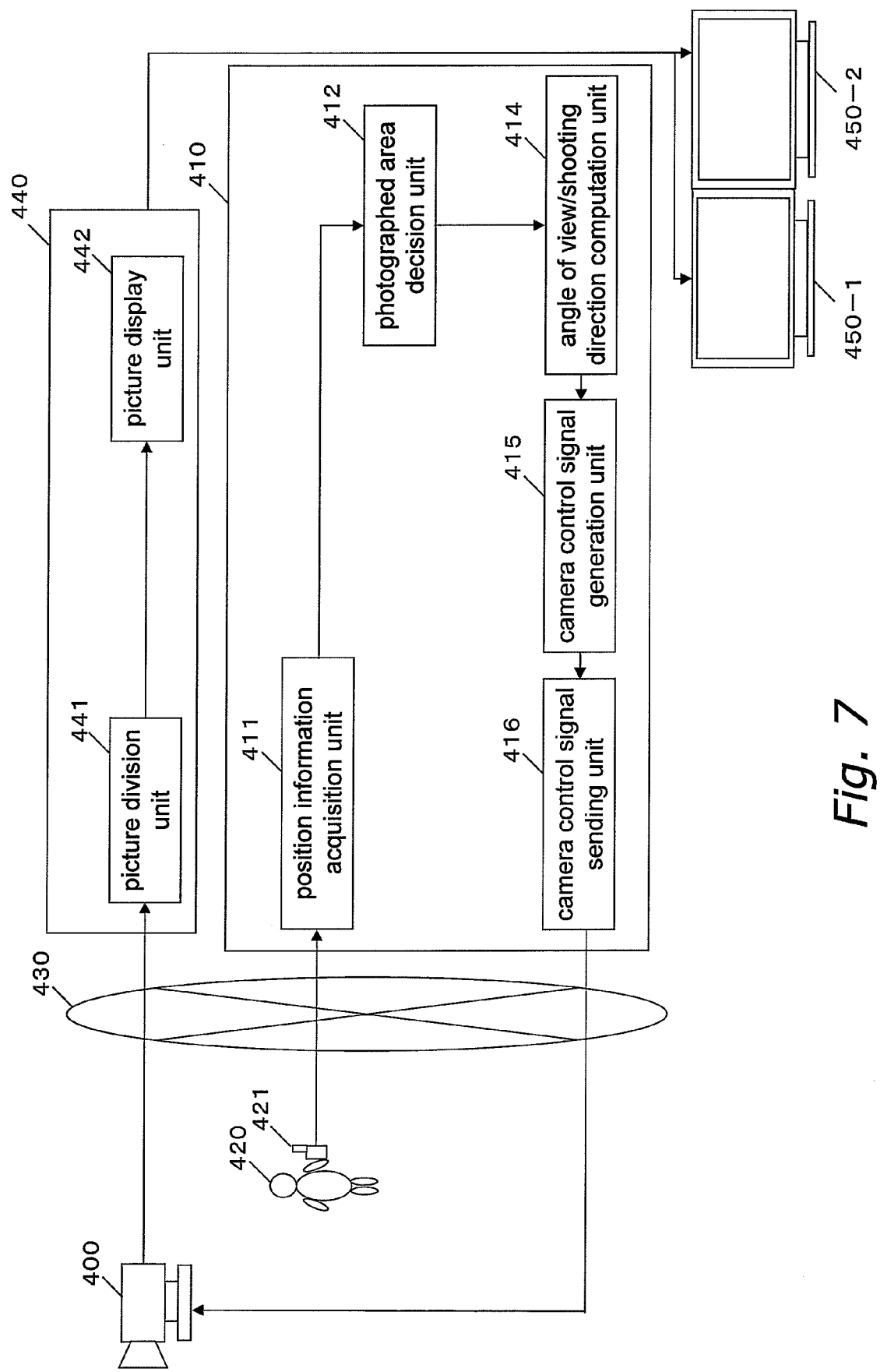
FIG. 7 is a block diagram illustrating a videoconference system serving as a first variation of the first embodiment.

In the first embodiment, the camera control unit 410 is installed along with the camera 400. However, the camera control unit 410 may be installed along with the image display device 440 via the network 430, such as is illustrated in FIG. 7, without presenting any problems. In such a case, the camera control signal sending unit 416 sends the signal that controls the angle of view and the capturing direction of the camera 400 via the network 430. The position information acquisition unit 411, meanwhile, acquires the position information of the object 420 via the network 430. The camera control method of the camera control unit 410 is the same as described above.

(Second Variation)

Figure 8:
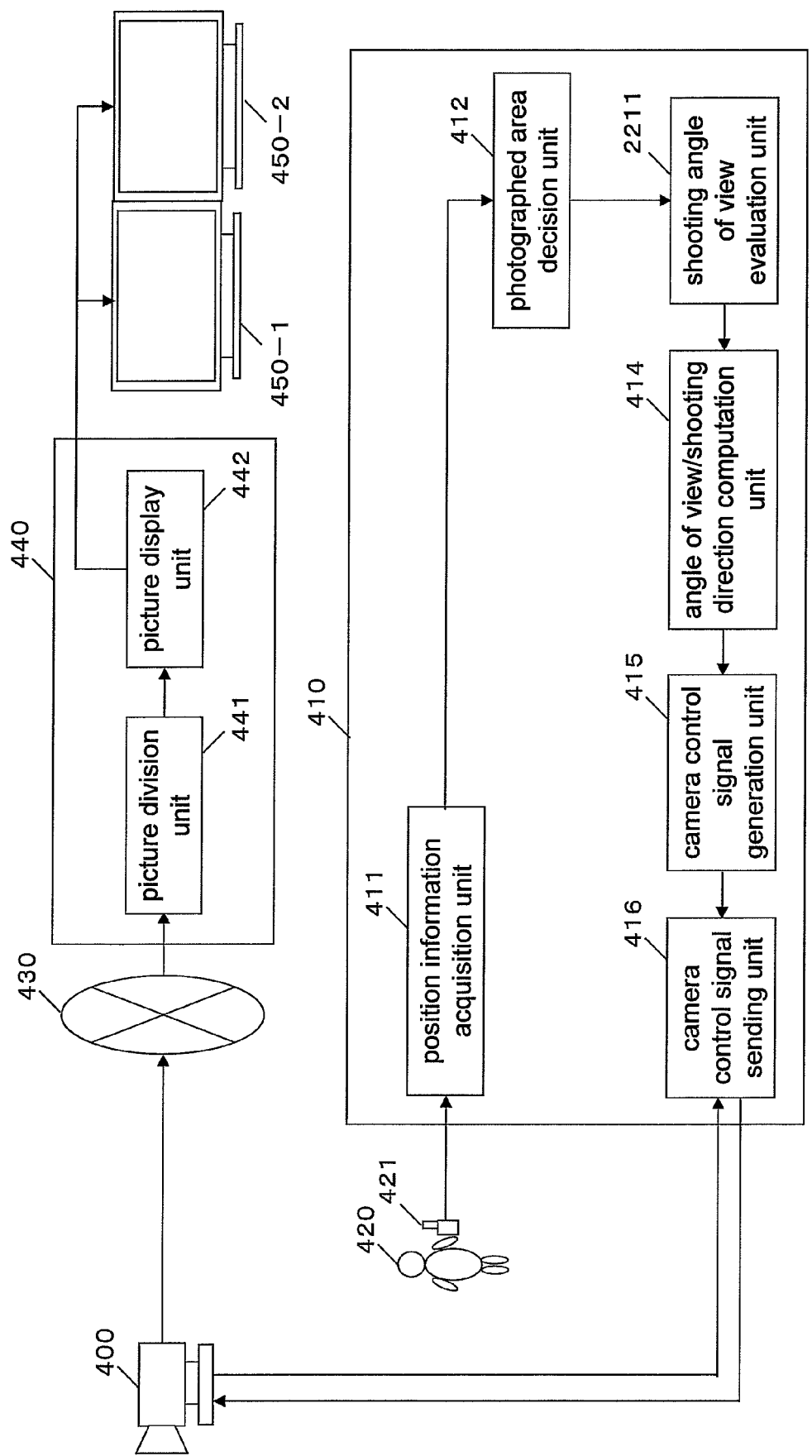
FIG. 8 is a block diagram illustrating a videoconference system serving as a second variation of the first embodiment.

In the case where the objects are people, and there is demand for the people to be displayed on large screens at as close to life size as possible so as to give viewers a high sense of presence, as if the people which are actually at a remote location are present before their very eyes, a shooting angle of view evaluation unit 2211 is added, as illustrated in FIG. 8. The shooting angle of view evaluation unit 2211 is used to set the border lines in advance so that the humans appears as close to life size as possible and so that the shooting angle of view allows all the humans to appear in the camera, making it possible to respond to the abovementioned demand. In other words, the shooting angle of view evaluation unit 2211 can extract the capturing area optimal for the person viewing the image.

Figure 9:
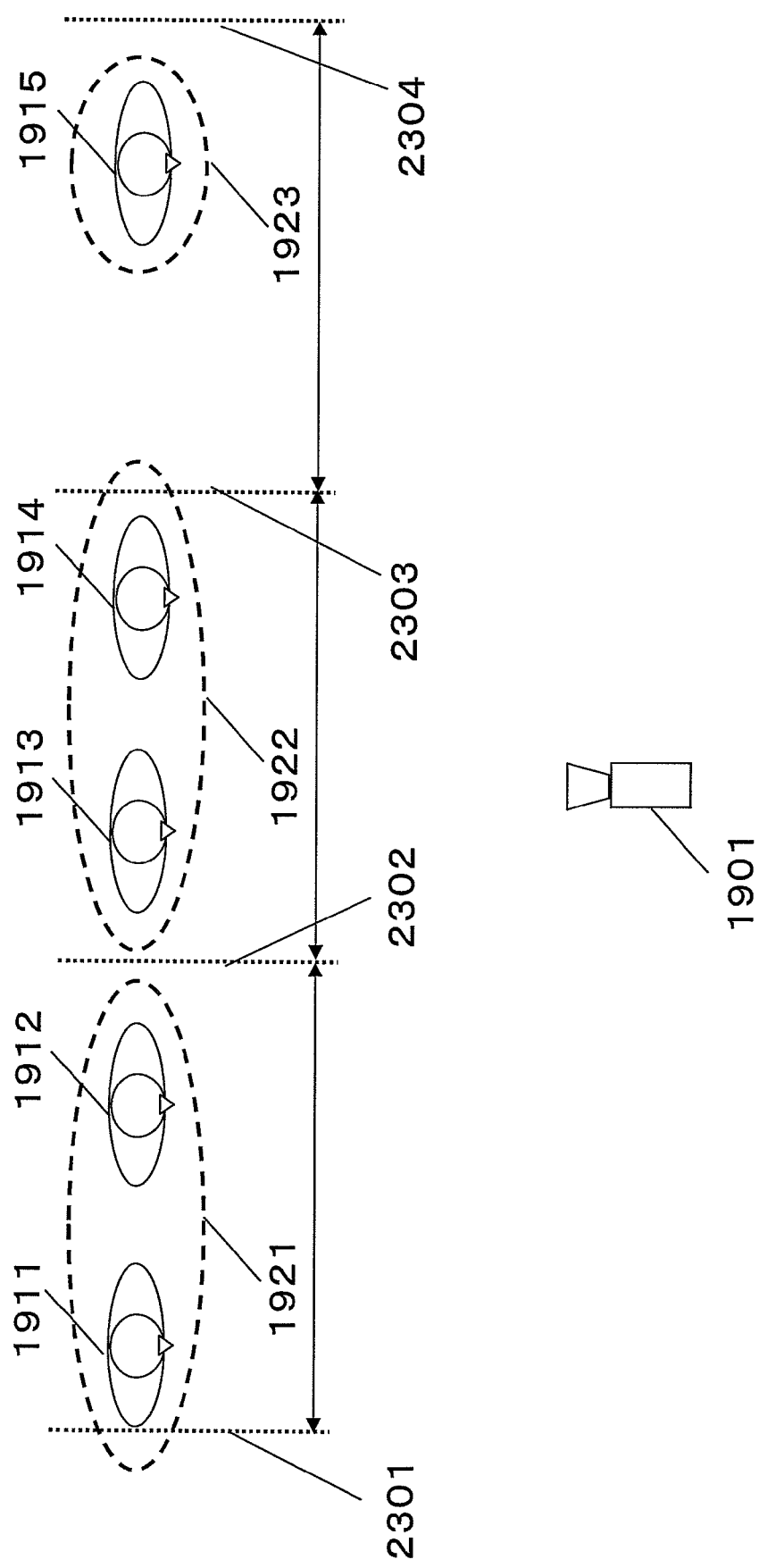
FIG. 9 is a diagram illustrating a method by which a shooting angle of view evaluation unit calculates the angle of view and capturing direction of a camera.

A method by which the shooting angle of view evaluation unit 2211 computes the angle of view and the capturing direction of the camera 400 shall be described with reference to FIGS. 8 and 9. After the capturing area determination unit 412 has determined the grouping pattern as described above (ST18050 in FIG. 3), the shooting angle of view evaluation unit 2211 determines whether or not the length between border lines is greater than a predetermined length starting with the shortest distance between border lines (in other words, starting with the pattern with the shortest distance, and moving to the pattern with the next-shortest pattern after that, and so on). As shown in FIG. 9, the shooting angle of view evaluation unit 2211 compares the lengths between the border lines 2301 to 2304 with the predetermined length. The "predetermined length" is, for example, a length that allows for life-size shooting. If the lengths between border lines are shorter than the predetermined length, the humans will be displayed in the screen at a size greater than life size, which imparts a sense of oppression on the viewer of the image.

If the lengths between the border lines are shorter than the predetermined length, that pattern is not employed. Instead, the next pattern in the order from shortest length between border lines is selected from the patterns selected by the capturing area determination unit 412, and the aforementioned determination is carried out. The same operation is repeated thereafter, and when the evaluation of a pattern indicates that the humans can be displayed at less than life size, that pattern is selected, and the border line positions in that pattern are set as the border line positions of the display.

Note that the shooting angle of view evaluation unit 2211 used in the first embodiment can also achieve the same effects in other embodiments, and the application thereof is not intended to be limited to the present embodiment.

(Third Variation)

Figure 10:
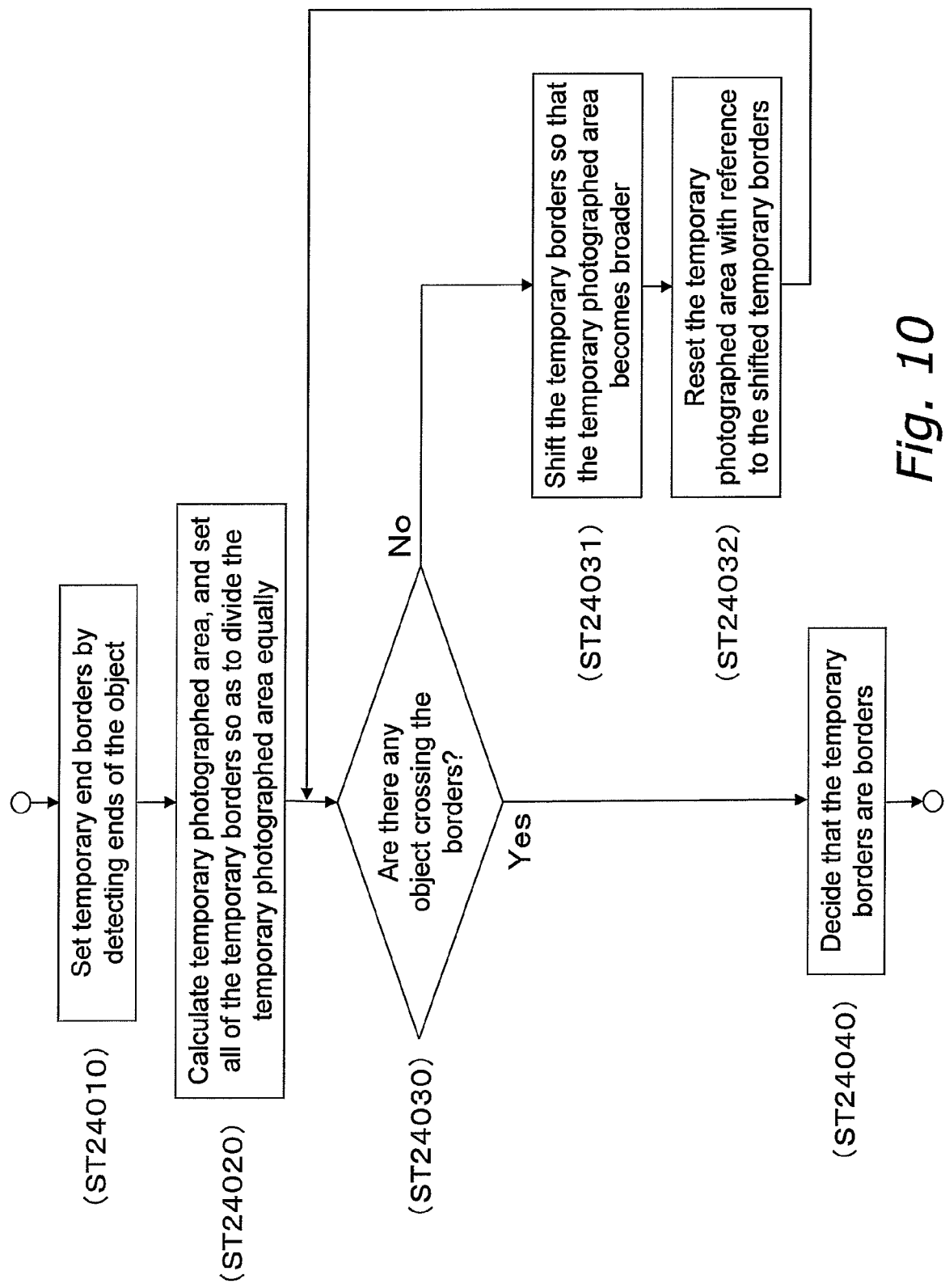
FIG. 10 is a flowchart illustrating a procedure by which a capturing area determination unit determines a capturing area, serving as a third variation of the first embodiment.
Figure 11:
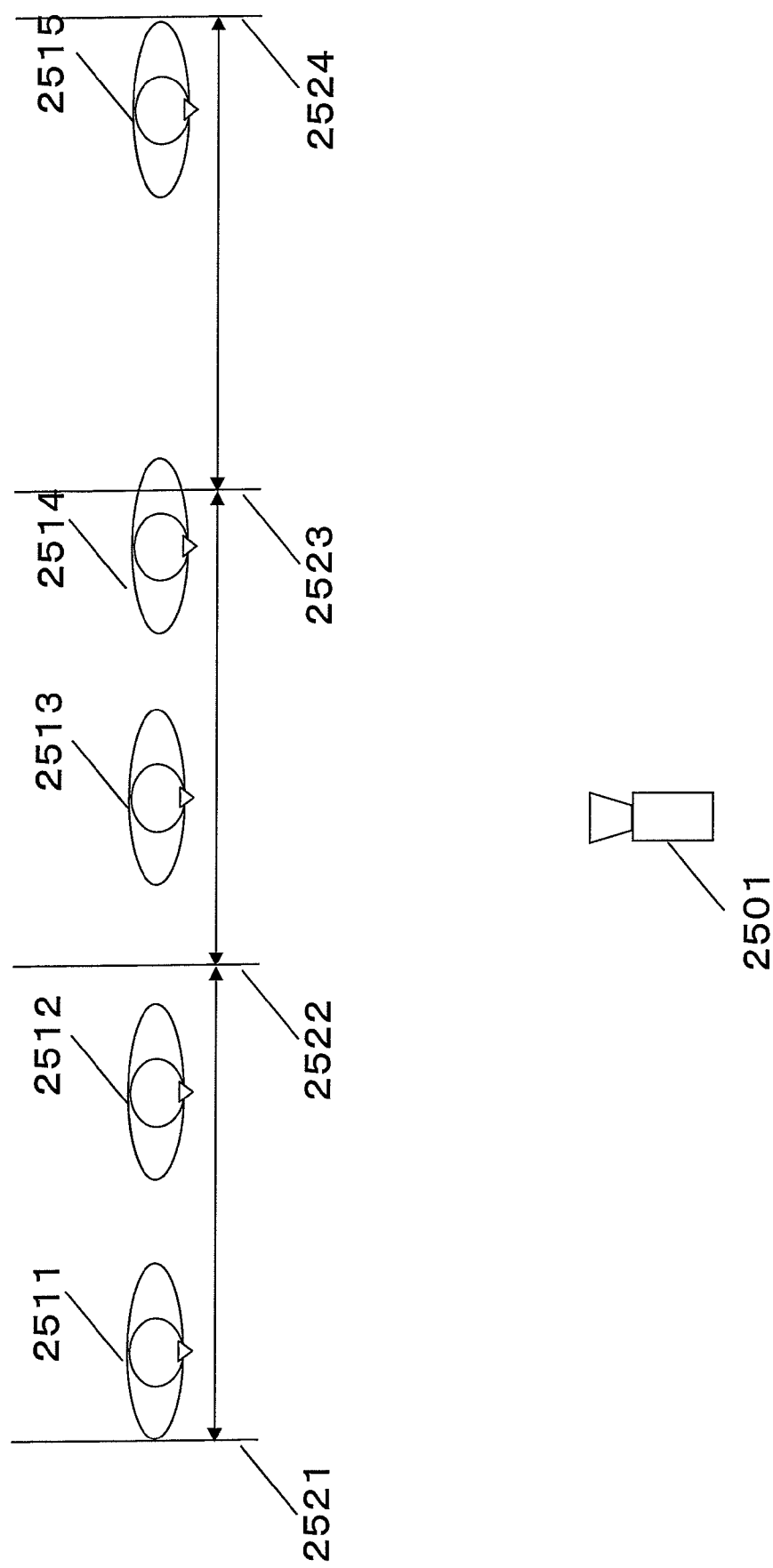
FIG. 11 is a schematic diagram illustrating a method for determining the position of a border line.
Figure 12:
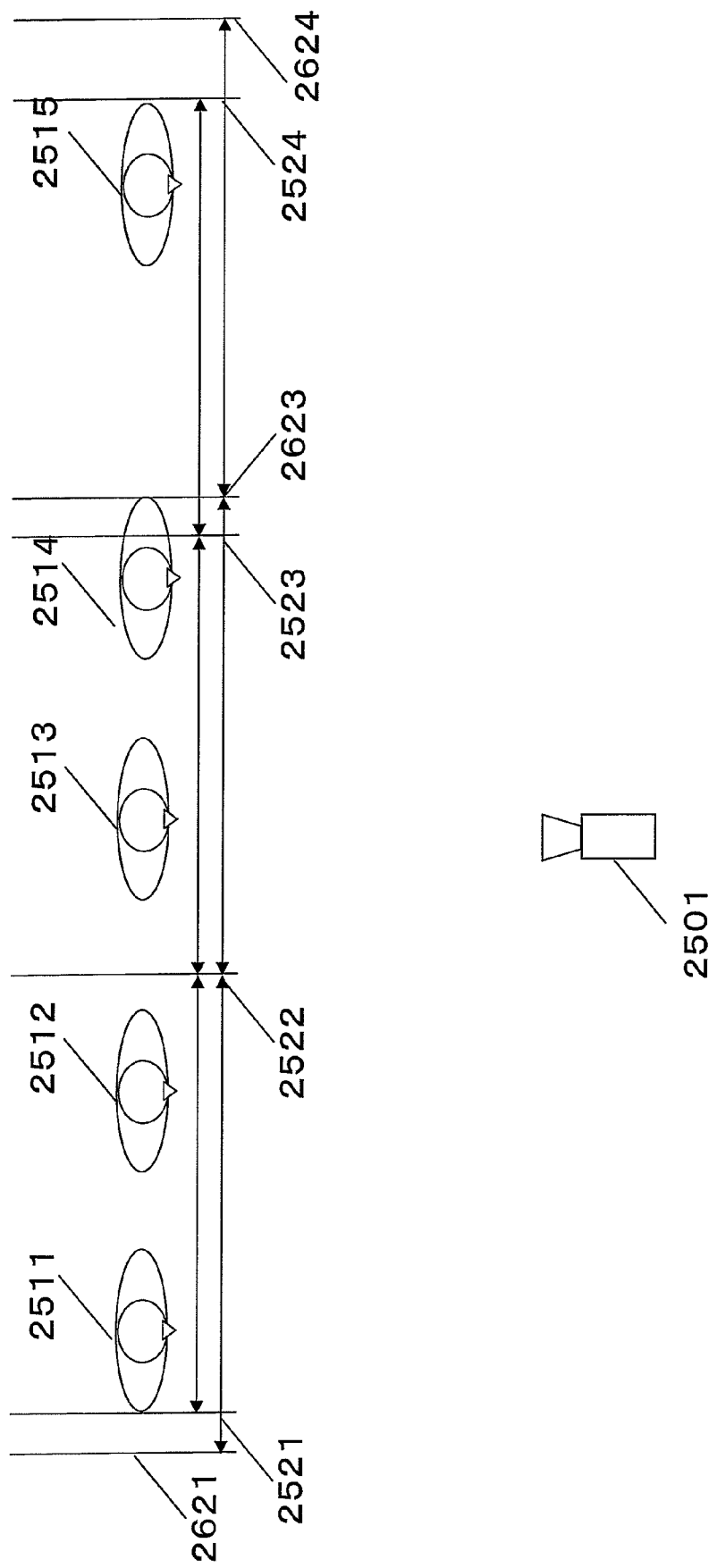
FIG. 12 is a schematic diagram illustrating a method for shifting a border line between groups.

A different method can be used for the capturing area determination unit 412 to determine the border lines, rather than using the method described with reference to FIGS. 3 to 6. This method, by which the capturing area determination unit 412 determines the border lines, shall be described with reference to FIGS. 10 to 12.

Upon acquiring the position information of the objects from the position information acquisition unit 411, the capturing area determination unit 412 extracts the objects positioned at both sides relative to the position at which the camera is installed and determines temporary border lines at both sides based on the position of the objects. In FIG. 11, 2511 to 2515 indicate objects present within the capturing area, and of these, the objects 2511 and 2515 correspond to the objects positioned at both sides relative to a camera 2501. The capturing area determination unit 412 sets temporary border lines 2521 and 2524 at both sides based on the position of these objects (ST24010).

The capturing area determination unit 412 computes a temporary capturing area based on the temporary border lines 2521 and 2524, divides the result of this computation by the number of screens 450, and determines all the temporary border lines (ST24020). 2522 and 2523 indicate the middle temporary border lines determined based on the temporary border lines 2521 and 2524 on both sides and the number of screens 450, and the distances between the temporary border lines 2521 and 2522, 2522 and 2523, and 2523 and 2524, respectively, are equal.

The capturing area determination unit 412 then determines whether or not all of the temporary border lines cross any of the objects (ST24030). If all of the temporary border lines do not cross any of the objects, the temporary border lines are finalized as the border lines (ST24040). However, if even one of the temporary border lines is present on any of the objects, the temporary border lines are shifted in directions that expand the capturing area (ST24031). In the example shown in FIG. 12, the temporary border line 2523 is present on the object 2514, and is therefore shifted to the position 2623, which does not cross the object 2514. After the temporary border line is shifted, all other temporary border lines are shifted so that the distances between the border lines are equal (ST24032). In the example shown in FIG. 12, the temporary border line 2521 is shifted to the position 2621, and the temporary border line 2524 is shifted to the position 2624. After the temporary border lines have been shifted, it is once again determined whether or not all the temporary border lines are present on any of the objects, and the abovementioned processes are repeated until none of the temporary border lines are present on any of the objects.

The capturing area determination unit 412 determines the border lines through the abovementioned processes. The operational process up to the camera control, which follows the determination of the border lines, is performed using the same method described earlier.

Second Embodiment

Figure 13:
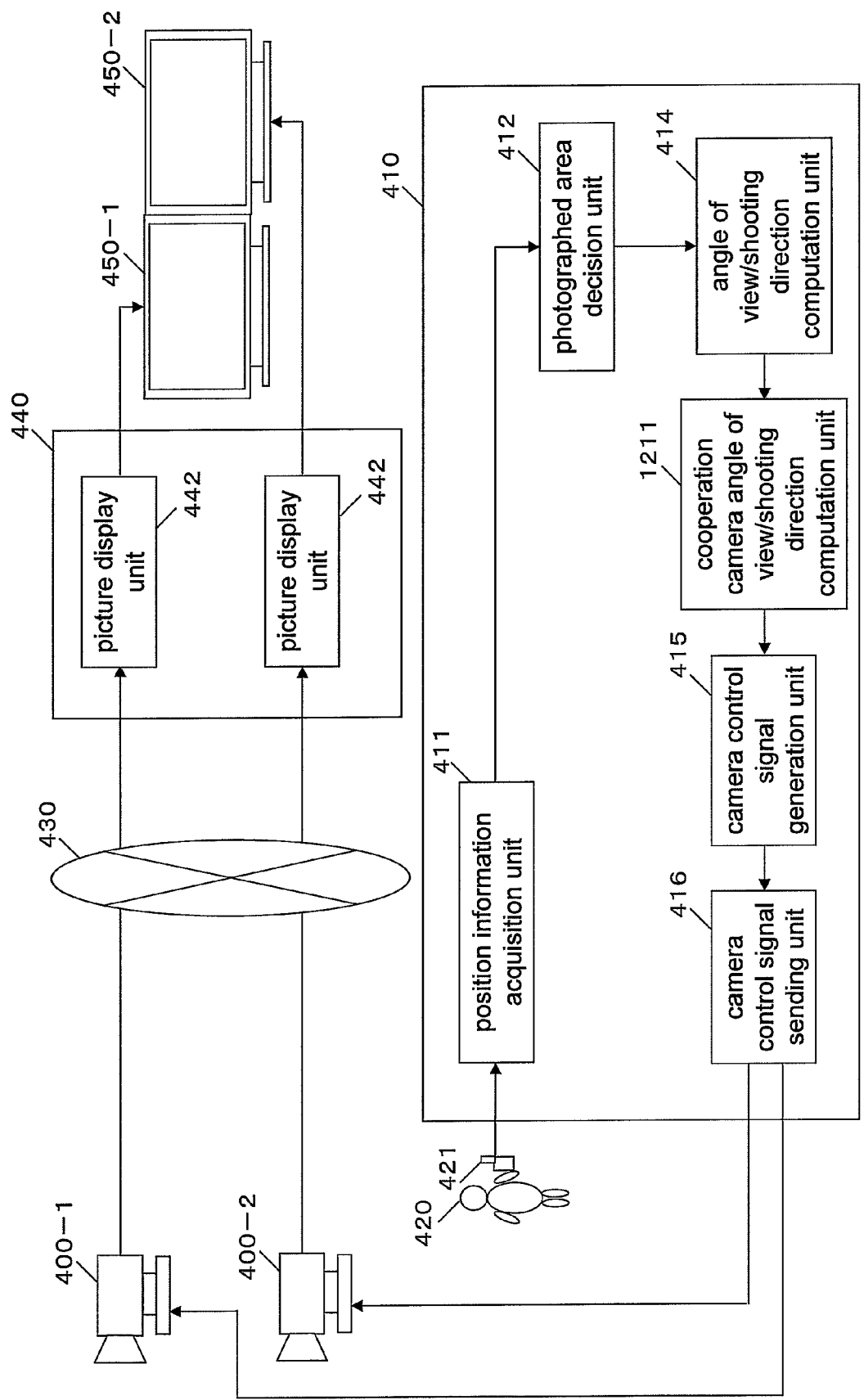
FIG. 13 is a block diagram illustrating a videoconference system according to a second embodiment.

FIG. 13 is a block diagram illustrating the main configuration of a videoconference system according to a second embodiment of the present invention. Note that part of this videoconference system is configured identically to the system illustrated in FIG. 1; constituent elements identical to those shown in FIG. 1 shall be given identical reference numerals, and descriptions thereof shall be omitted.

A characteristic of the present embodiment is that plural cameras are present, and a cooperation camera angle of view/capturing direction computation unit 1211, which first computes the capturing direction of a single camera and then determines the capturing directions of the remaining cameras, is provided. This makes it possible to control plural cameras so that objects do not cross the borders of plural arranged screens when images from the cameras are displayed on those plural screens.

FIG. 13 illustrates the configuration of a system in which plural cameras are present. The parts of FIG. 13 that differ from FIG. 1 are as follows: first, plural cameras 400 are present; and second, plural image display units 442 are provided instead of the image division unit 441 of the image display device 440. Note that the configuration as shown in FIG. 13 assumes that the image from a single camera is displayed in a single display. The angles of view of the cameras 400-1 and 400-2 are thus made to be identical, and the capturing direction of the cameras are controlled so that the borders of the fields of view of the cameras 400-1 and 400-2 intersect at a certain set distance 1300, as shown in FIG. 14.

Figure 14:
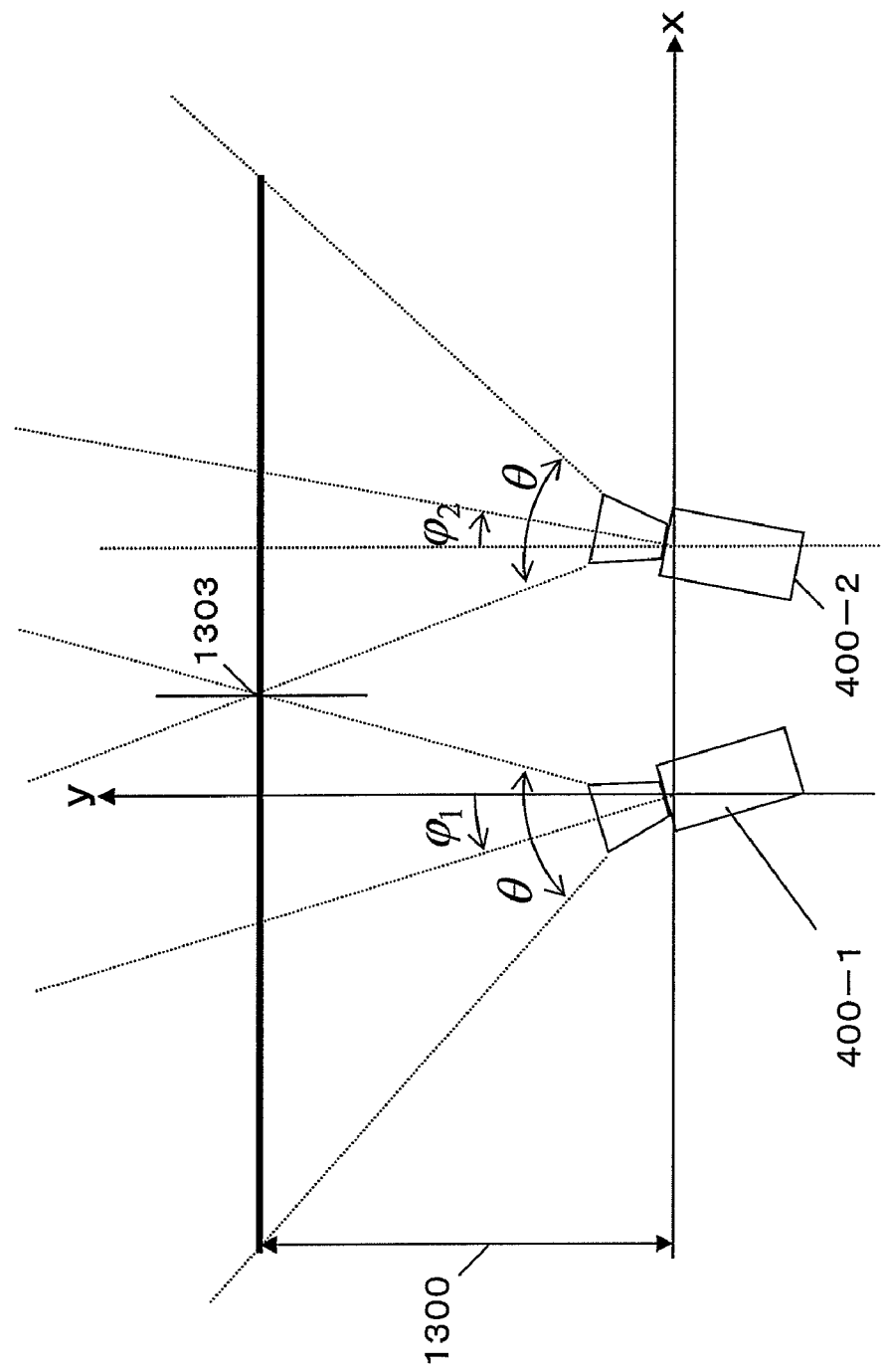
FIG. 14 is a diagram illustrating an example of an area captured by a camera.

The set distance 1300 may be set freely; however, the smaller this distance is, the greater the areas that appear in the cameras 400-1 and 400-2 will become, as shown in FIG. 14. For this reason, the same image can be seen in the border areas of the plural screens, leading to a loss of the seamlessness of the images appearing in the screens. Conversely, if the set distance 1300 is too large, blind areas, which are captured by neither the camera 400-1 nor the camera 400-2, will occur, which also results in a loss of the seamlessness of the images appearing in the screens. Accordingly, in order to maintain the seamlessness of the images that appear in the screens, it is preferable to set the set distance 1300 to the distance from the camera to the object, or, in the case of videoconferencing, the distance from the desk or the like to the object; alternatively, if indoors, it is preferable to set the set distance 1300 to the distance from the camera to the wall.

In the first embodiment, the capturing area determination unit 412 refers to the division method used by the image division unit 441, sets borders as the border lines of the display, and determines whether or not an object crosses those border lines. However, in the second embodiment, the ends of the capturing areas of the cameras 400-1 and 400-2 are set as the border lines. Hereinafter, using FIG. 13, descriptions shall be given regarding a method for controlling cameras 400-1 and 400-2 so that an object 420 does not cross the border between screens 450-1 and 450-2, when the object 420 has been captured by the cameras 400-1 and 400-2 and crosses the border between the screens 450-1 and 450-2.

In FIG. 13, the process up until the capturing area determination unit 412 acquires the position information of the object 420 from the position information acquisition unit 411 is the same as that described in the first embodiment.

When plural cameras are used, the method used by the capturing area determination unit 412 for computing the positions of the borders differs from that described in the first embodiment. This method for computing the positions of the borders shall be described hereinafter with reference to FIG. 14. As shown in FIG. 14, x and y axes are provided, with the shooting angle of the camera taken as 0 degrees when the camera is aligned with the y axis; the counter-clockwise direction is taken as plus, and the clockwise direction is taken as minus.

The capturing direction of the camera 400-1 is expressed as $\phi 1$, capturing direction of the camera 400-2 is expressed as $\phi 2$, and the angle of view of the cameras are expressed as $\theta$; the coordinates at which the camera 400-1 is installed are expressed as (0, 0), the coordinates at which the camera 400-2 is installed are expressed as (x2, 0), and the set distance 1300 is expressed as y. The x coordinate of the coordinates (xb, y) of a border position 1303 of the camera 400-1 can thus be expressed by the following equation.

$$x_b = y \tan\left(\frac{\theta}{2} - \varphi_1\right)$$ [Equation 2]

The capturing area determination unit 412 refers to the coordinates (xb, y) of the border position 1303 as computed using Equation 2 to determine whether or not the object 420 crosses the border between the screens 450-1 and 450-2. The method for this determination is the same as described above. In the case where the capturing area determination unit 412 has determined that the object 420 crosses the border between the screens 450-1 and 450-2, the capturing area determination unit 412 determines border lines so that the object 420 does not cross the border between the screens, and furthermore sets the capturing area. The angle of view/capturing direction computation unit 414 then computes the angle of view/capturing direction of the camera based on the capturing area obtained from the capturing area determination unit 412.

The cooperation camera angle of view/capturing direction computation unit 1211 refers to the capturing direction of one of the cameras as computed by the angle of view/capturing direction computation unit 414, and calculates the capturing direction of the camera for which the capturing direction has not yet been calculated by the angle of view/capturing direction computation unit 414. Hereinafter, a camera for which the angle of view/capturing direction computation unit 414 has not yet computed the capturing direction shall be called a "cooperation camera". The capturing direction $\phi 2$ of the cooperation camera in FIG. 14 can be expressed as follows, using the result of Equation 2.

$$\varphi_2 = \tan^{-1}\left(\frac{x_2}{y} - \tan\left(\frac{\theta}{2} - \varphi_1\right)\right) - \frac{\theta}{2}$$ [Equation 3]

The camera control signal generation unit 415 generates a signal that controls the capturing directions of the cameras to take on the capturing directions computed by the angle of view/capturing direction computation unit 414 and the cooperation camera angle of view/capturing direction computation unit 1211. The processes performed thereafter for controlling the cameras are the same as described above.

Through the abovementioned technique, it is possible, even if plural cameras are present, to control the capturing directions and angles of view of the cameras so that an object does not cross the border between plural displays, and possible to shoot images with comparatively less field-of-view distortion than when using the camera's wide-angle lens. Furthermore, because the images are not divided, enlarged, and so on, a higher-resolution image can be displayed. Through this, objects are captured at a wide angle of view but kept within the screens, and the objects do not cross the border portions between screens, making it possible to eliminate abnormalities in the image; accordingly, there is an effect that a sense of presence not available conventionally can be imparted on users of the videoconference system.

Figure 15:
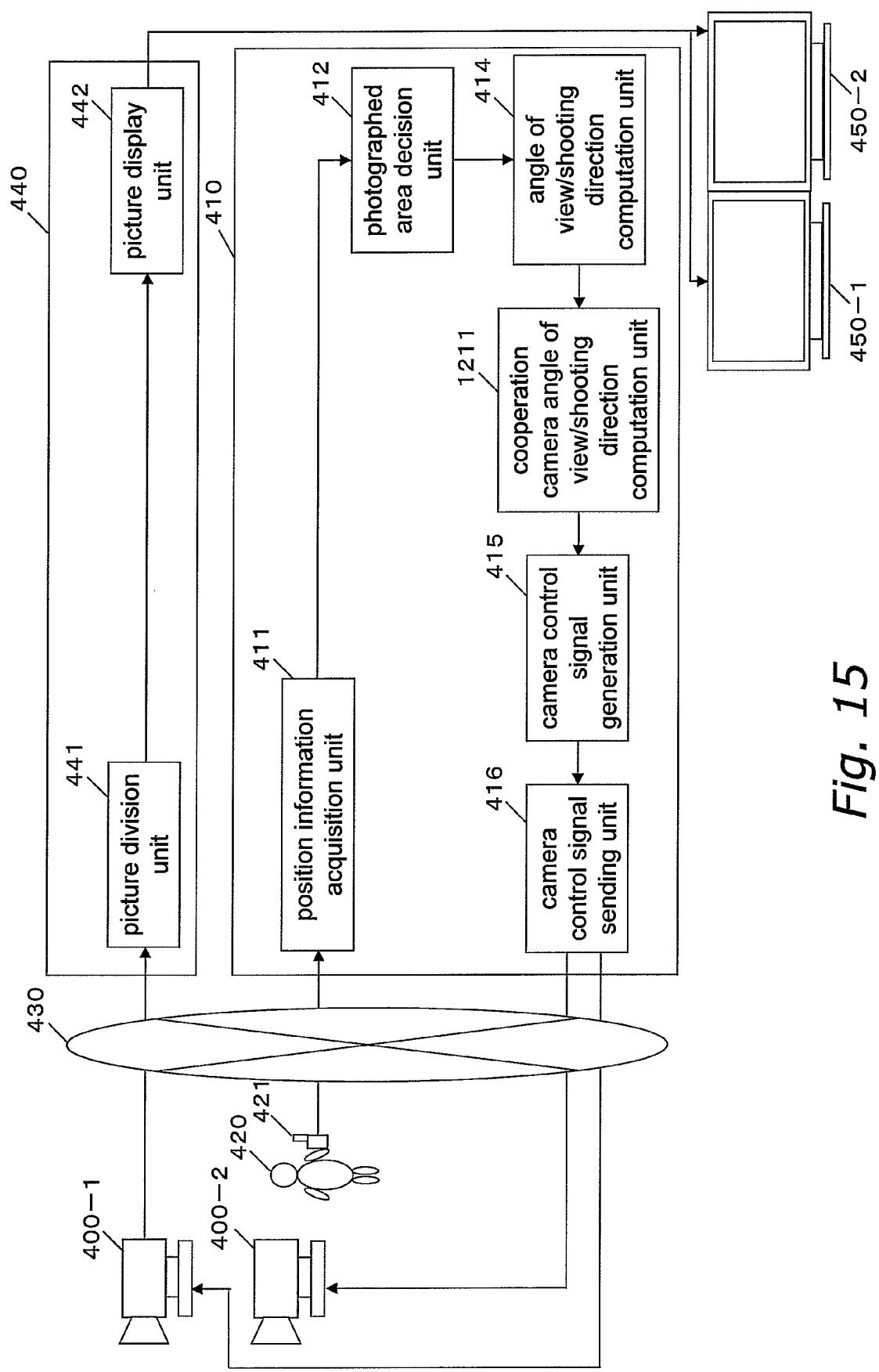
FIG. 15 is a block diagram illustrating a videoconference system serving as a variation of the second embodiment.

In the second embodiment, the camera control unit 410 is installed along with the cameras 400-1 and 400-2. However, as in the first embodiment, the camera control unit 410 may be installed along with the image display device 440, such as is illustrated in FIG. 15, without presenting any problems. In such a case, the camera control signal sending unit 416 sends the signal that controls the angle of view and the capturing direction of the camera 400 via the network 430. The position information acquisition unit 411, meanwhile, acquires the position information of the object 420 via the network 430. The camera control method of the camera control unit 410 is the same as described above.

In the second embodiment, FIG. 14 depicts the cameras 400-1 and 400-2 as viewed from above. However, in the case where the plural displays are arranged in a display vertical direction rather than in a display horizontal direction, an axis spanning from the ground in the upward direction is newly provided, and it can then be determined whether or not the object 420 crosses the border between the vertically-arranged displays in the same manner as described in the first embodiment, based on the heights of the cameras 400-1 and 400-2 and the height of the object 420.

Finally, the second embodiment describes a case where only a single object 420 is present; however, in the case where plural objects 420 are present, there are cases where controlling the camera so that one of the objects 420 does not cross the border between the screens may cause problems, resulting in an angle of view in which a different object 420 crosses the border between the screens, a different object 420 extending outside of the screens, or the like. In such a case, as in the first embodiment, the angle of view/capturing direction computation unit 414 adjusting the angle of view to a wider angle as well as the capturing direction, making it possible to control the cameras so that none of the objects cross the border between the screens.

Third Embodiment

Figure 16:
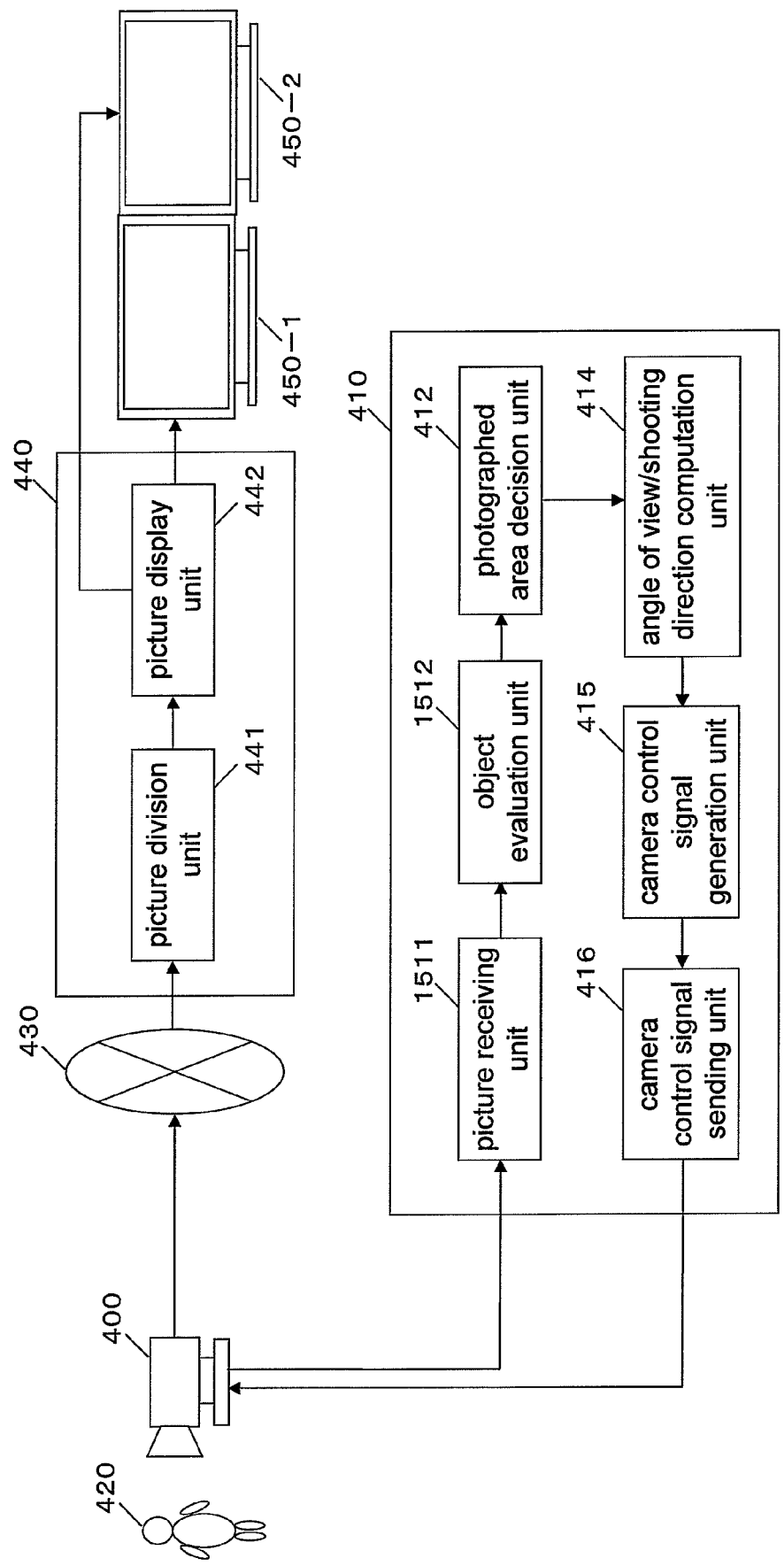
FIG. 16 is a block diagram illustrating a videoconference system according to a third embodiment.

FIG. 16 is a block diagram illustrating the main configuration of a videoconference system according to a third embodiment of the present invention. Note that this videoconference system has the same basic configuration as the system illustrated in FIG. 1; constituent elements identical to those shown in FIG. 1 shall be given identical reference numerals, and descriptions thereof shall be omitted.

A characteristic of the third embodiment is that the position information of the object 420 is not found using a device such as a position detection tag; instead, object detection technology is used to determine the position by referring to the image captured by the camera 400. This makes it possible to control the camera 400 so that the object 420 does not cross the borders of plural arranged screens 450-1 and 450-2 when images from the cameras are displayed on those plural screens, even when a position detection device is not attached to the object 420.

The configuration shown in FIG. 16 differs from the other embodiments in that the camera control unit 410 is provided with an image receiving unit 1511 that receives images from the camera 400, and an object evaluation unit 1512 that determines whether or not the object 420 is present within the received images. A process by which the position of the object 420 is identified using the image receiving unit 1511 and the object evaluation unit 1512, and the camera 400 is controlled, shall be described hereinafter.

When the image receiving unit 1511 receives an image from the camera 400, the object evaluation unit 1512 takes the image data and determines whether or not the object 420 is present therein.

The method for detecting the object can employ various existing image recognition techniques. For example, if the object is the face of a human, one of the detection methods disclosed in Non-Patent Document 3 (Ming-Hsuan Yang, David J. Kriegman, Narendra Ahuja, "Detecting Faces in Images: A Survey", IEEE Transactions on Pattern Analysis and Machine Intelligence, Vol. 24, No. 1, pp. 34-pp. 58, January 2002) may be used, whereas if the object is any sort of object, the detection method disclosed in Non-Patent Document 4 (Kentaro Toyama, John Krumm, Barry Brumitt, Brian Meyers, "Wallflower: Principles and Practice of Background Maintenance", Seventh International Conference on Computer Vision, pp. 255-261) may be used.

In the case where the object evaluation unit 1512 has determined that the object 420 is not present within the image, the image data is re-acquired, and it is determined if the object 420 has appeared in the image. Note that the operation for re-acquiring the image data may be executed immediately after the object evaluation unit 1512 determines the presence or absence of the object; alternatively, this operation may be executed after a set amount of time has passed, in order to reduce the processing load placed on the camera control unit 410.

In the case where the object evaluation unit 1512 has determined that the object 420 is present within the image, the capturing area determination unit 412 is instructed to determine whether or not that object is present in the border portion between screens.

Upon receiving the instruction from the object evaluation unit 1512, the capturing area determination unit 412 takes, from the object evaluation unit 1512, the position information of the object 420 that is within the image. It is assumed here that the capturing area determination unit 412 is already aware of the method used by the image division unit 441 of the image display device 440 for dividing the image captured by the camera 400. The object evaluation unit 1512 determines whether or not the object 420 crosses the border between the screens 450-1 and 450-2 based on the position information of the object 420 and the method by which the image division unit 441 divides the image.

Figure 17:
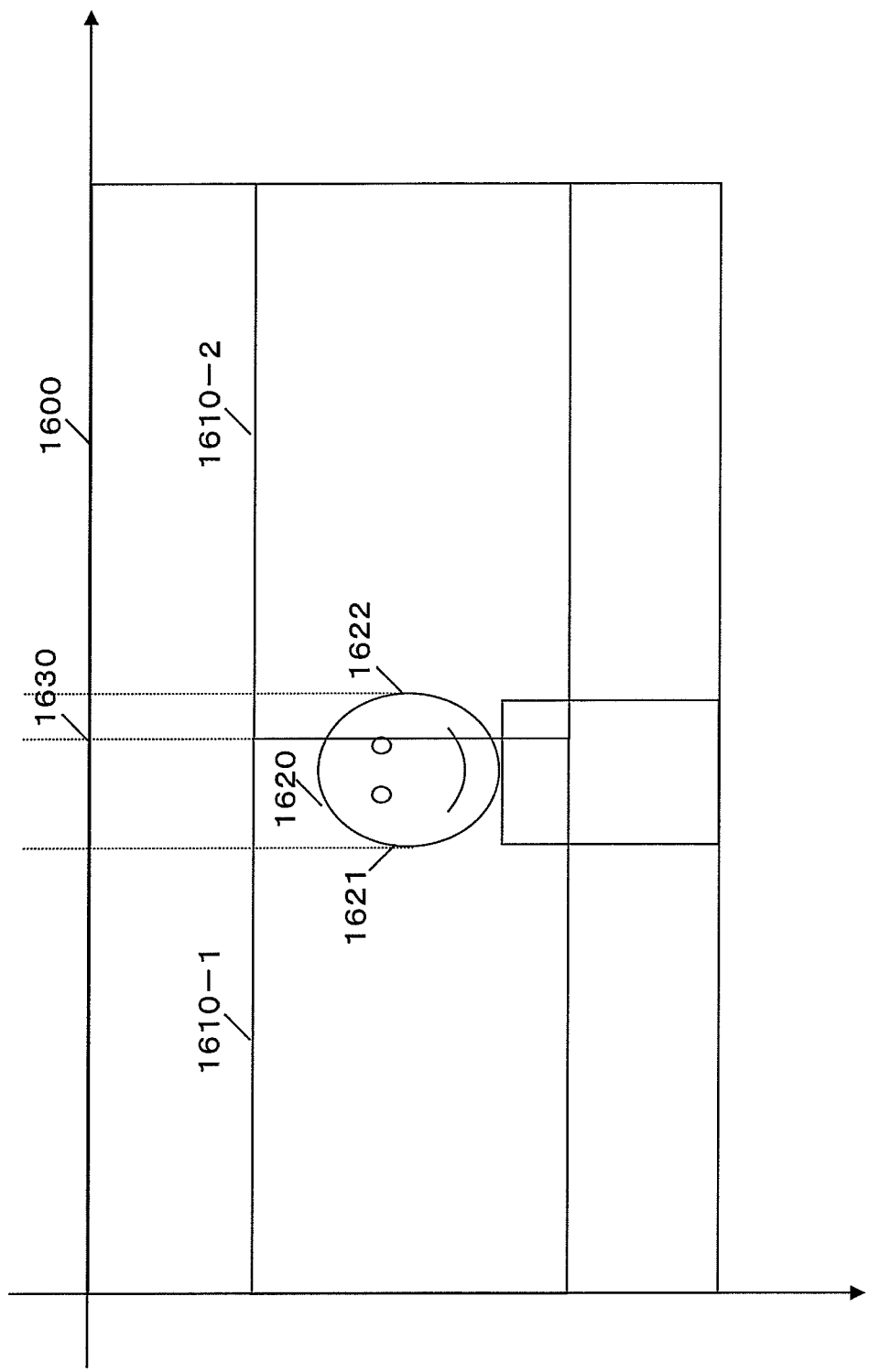
FIG. 17 is a diagram illustrating a camera image, a method for dividing the image, and an object captured, according to the third embodiment.

An example of the image captured by the camera 400, the division method used by the image division unit 441 of the image display device 440, and the object 420 displayed in the screens is illustrated in FIG. 17. A method for determining whether or not the object 420 crosses the border portion between the screens 450-1 and 450-2 shall be described using FIG. 17.

In FIG. 17, 1600 indicates the entirety of the image captured by the camera; 1610-1 indicates the area displayed in the screen 450-1; 1610-2 indicates the area displayed in the screen 450-2; and 1620 indicates an object. Upon determining that an object is present, the object evaluation unit 1512 sends the coordinates of a left end 1621 and the right end 1622 of the object in the image to the capturing area determination unit 412. Assuming that the capturing area determination unit 412 is already aware of the position 1630 at which the image division unit 441 divides the image, and the x coordinate of the left end 1621 of the object is taken as Objleft, the x coordinate of the right end 1622 of the object is taken as Objright, and the x coordinate of the position 1630 at which the image is divided is taken as Bnd, Equation 4 is satisfied.

$$\text{Obj}_{left} \leq \text{Bnd} \leq \text{Obj}_{right} \qquad \text{[Equation 4]}$$

In the case where equation 4 is satisfied, it is determined that the object 420 crosses the border between the screens 450-1 and 450-2.

Note that when plural objects 420 are present in the screens, the determination using Equation 4 is carried out on all those objects; if even a single object that satisfies Equation 4 is present, it is determined that the border between screens is being crossed.

In the case where the capturing area determination unit 412 has determined that the object 420 crosses the border between the screens, the capturing area determination unit 412 determines border lines so that the object 420 does not cross the border of the screens, and furthermore sets the capturing area. The angle of view/capturing direction computation unit 414 then computes the angle of view/capturing direction based on that capturing area.

Figure 18:
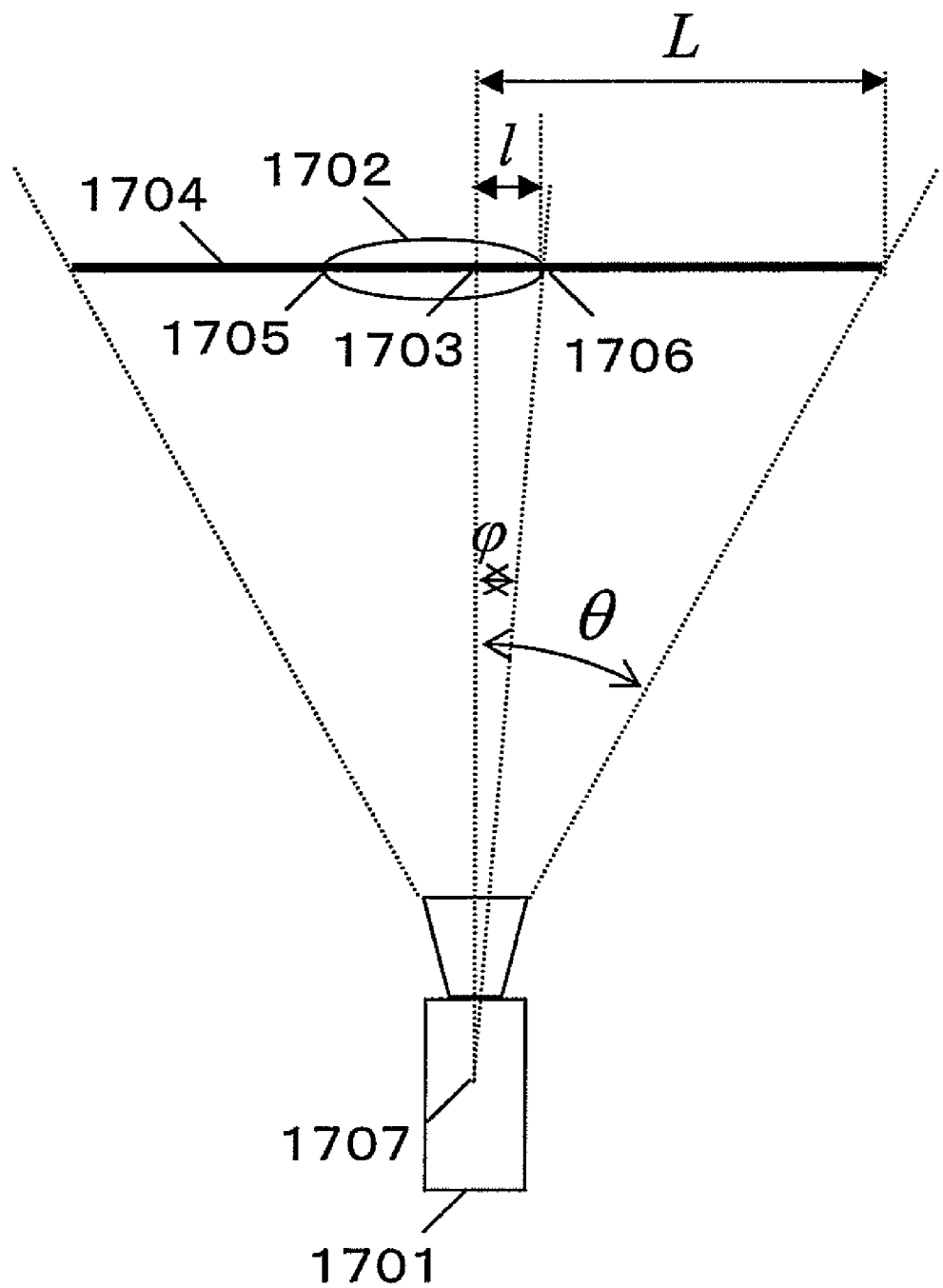
FIG. 18 is a diagram illustrating a camera control method according to the third embodiment.
Figure 19:
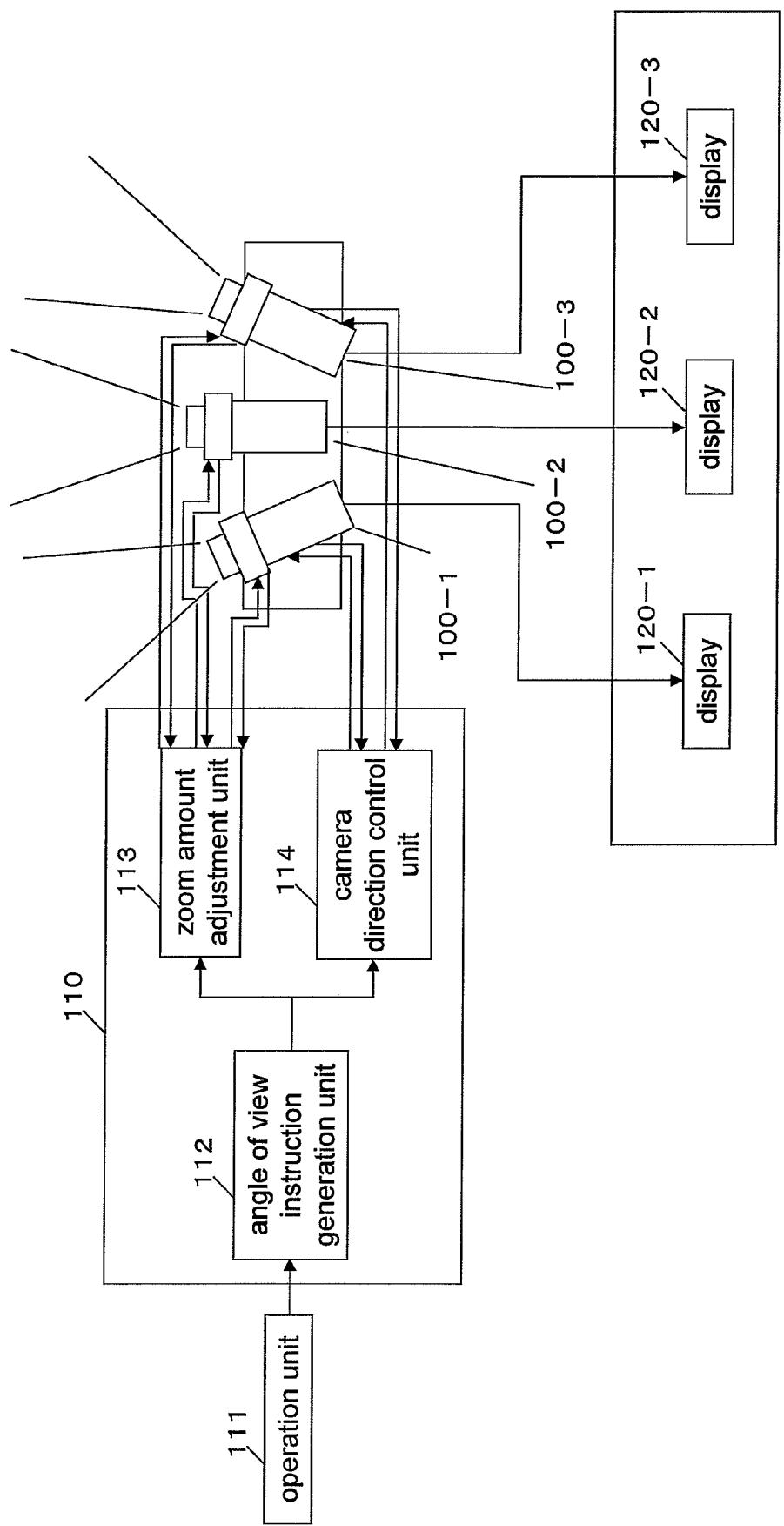
FIG. 19 is a block diagram of a camera control unit according to related art.
Figure 20:
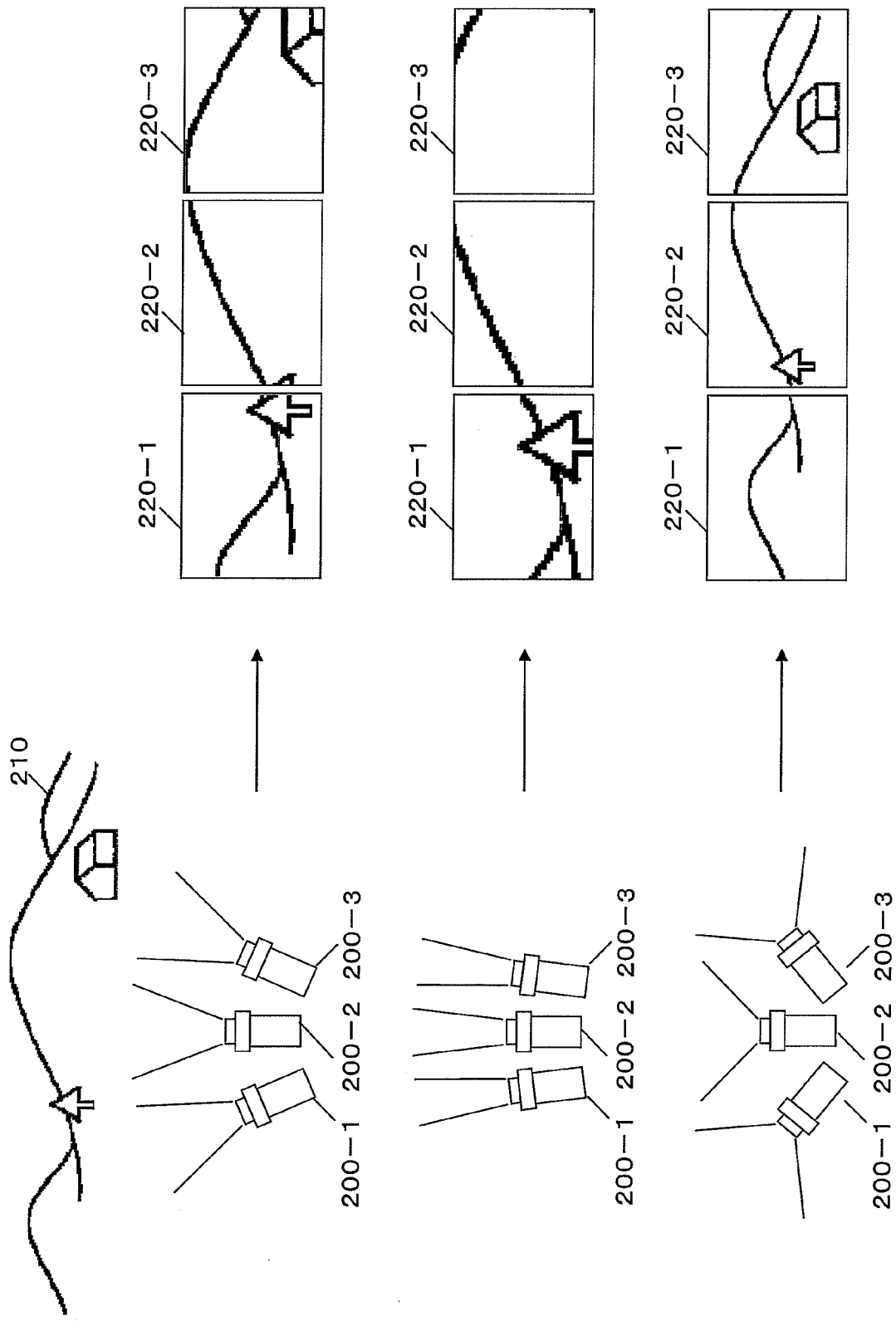
FIG. 20 is a diagram illustrating a camera control method and a displayed image according to the related art.
Figure 21:
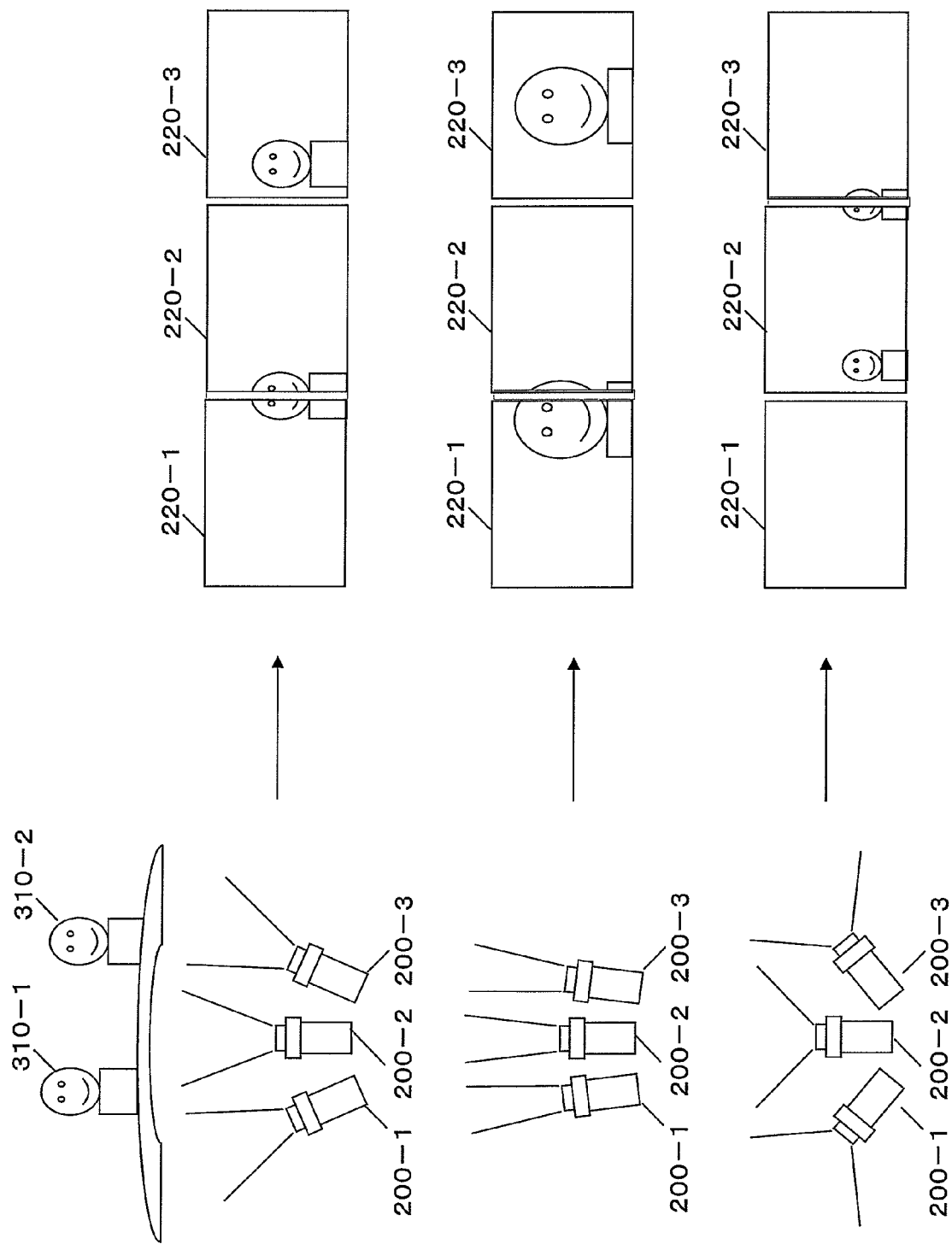
FIG. 21 is a diagram illustrating a problem with the related art.

FIG. 18 is a diagram illustrating a camera rotational angle computed by the angle of view/capturing direction computation unit 414 for an object 420 that crosses the border between screens, which ensures that the object does not cross the border between the screens. In FIG. 18, 1701 indicates a camera, 1702 indicates an object, 1703 indicates the border between screens divided by the image division unit 441 of the image display device 440, and 1704 indicates a capturing area.

In the third embodiment, it is determined whether the distance from the left end 1705 of the object 1702 to the border 1703 is longer than the distance from the right end 1706 of the object 1702 to the border 1703 or vice versa, and the camera 1701 is rotated so that the end that is closer comes toward the border 1703. In the present example, it is assumed that the distance from the right end 1706 to the border 1703 is shorter than the distance from the left end 1705 to the border 1703. Here, the entire object 1702 is shifted to the left side of the border 1703 when the camera is rotated by an angle φ made up of the rotational axis 1707 of the camera, the border 1703, and the right end 1706 of the object 1702; the result is that the object 1702 is contained within one of the plural screens. The angle φ can be found using the following equation.

$$\phi = \tan^{-1}((1/L)\tan\theta) \qquad \text{[Equation 5]}$$

Thereafter, in the same manner as in the first embodiment, the camera control signal generation unit 415 generates a signal controlling the camera to take on the angle found through Equation 5; the camera control signal is sent to the camera 400 by the camera control signal sending unit 416, and thus it is possible to control the camera 400.

It should be noted that even if plural cameras are present, a method such as that shown in the second embodiment can be used to determine whether an object crosses the border between screens, and the camera can be controlled so that the object does not cross the border between screens.

Meanwhile, with the configuration illustrated in FIG. 17, if an object is present outside of the field of view of the camera 400, the camera cannot be moved to a position in which the object enters the field of view of the camera. This problem can be solved by a scheme that allows the user who is viewing the screens 450-1 and 450-2 to manually control the camera remotely in order to search for the object, or a scheme that allows a wireless tag, a position detection camera, or the like to find position information, as in the first embodiment, and so on.

While exemplary embodiments of the present invention have been described, the invention is not intended to be limited to these exemplary embodiments. Other modifications may be made without deviating from the essential spirit of the present invention.

Furthermore, while a videoconference system is employed in the embodiments described thus far, the present invention may also be applied to other types of video display systems.

Note that the functional blocks shown in the block diagrams (e.g. FIG. 2) may be implemented through computer software. In such a case, the software runs in tandem with, for example, hardware such as a CPU, memories, and so on, thereby implementing the above functions. The functional blocks may also be implemented using an LSI circuit, which is an integrated circuit. They may be implemented as individual chips, or a single chip may contain all or part of these functions.

The camera control unit of the present invention is useful as a camera control unit for a videoconference system or the like that displays images captured by a single or plural cameras on plural arranged screens.

This application claims priority to Japanese Patent Application No. JP2007-144785 filed on May 30, 2007 and Japanese Patent Application No. JP2008-136524 filed on May 26, 2008. The entire disclosures of Japanese Patent Application No. JP2007-144785 and No. JP2008-136524 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A camera control unit for use in a camera image display system, the camera control unit comprising:
a position information acquisition unit operable to acquire geometric position information of one or more objects captured by a camera having a controllable capturing direction and a controllable zoom ratio;
a capturing area determination unit operable to determine a capturing area of the camera so that the one or more captured objects do not cross a border of any of a plurality of displays and so that all of the one or more captured objects are displayed in the plurality of displays, the capturing area being determined based on the geometric position information acquired by the position information acquisition unit, the displays of the plurality of displays being arranged in a continuous manner to form a united display area, and the displays of the plurality of displays being configured to display images obtained by dividing an image captured by the camera so as to maintain a seamless display of the displayed images;
an angle of view/capturing direction computation unit operable to compute an angle of view and a capturing direction of the camera based on the determined capturing area of the camera;
a camera control signal generation unit operable to generate a camera control signal for controlling the camera to conform to the computed angle of view and the computed capturing direction;
a camera control signal sending unit operable to send the generated camera control signal to the camera; and
a processor configured to control at least one of the position information acquisition unit, the capturing area determination unit, the angle of view/capturing direction computation unit, the camera control signal generation unit, and the camera control signal sending unit,
wherein the capturing area determination unit sets a temporary capturing area based on positions of ends of the one or more objects, and sets temporary border lines so that the temporary capturing area is divided into equal divisions.

2. The camera control unit according to claim 1, wherein the capturing area determination unit (i) determines whether or not any object of the one or more objects crosses any temporary border line of the temporary border lines, (ii) shifts a position of the temporary border line crossed by the object, when the object crosses the temporary border line, the position of the temporary border line being shifted so that the object no longer crosses the temporary border line, (iii) shifts remaining temporary border lines, of the temporary border lines, in accordance with the shifted temporary border line, and (iv) finalizes temporary border lines as border lines of the plurality of displays.

3. The camera control unit according to claim 2, wherein the capturing area determination unit sets an area between two outermost border lines as the capturing area.

4. The camera control unit according to claim 1, wherein the camera control signal sending unit sends the camera control signal to a network, so as to control the computed capturing direction and the computed angle of view of the camera via the network.

5. The camera control unit according to claim 1, wherein the camera control signal sending unit sends the camera control signal to a network, so as to control capturing directions and angles of view of the plurality of cameras via the network.

6. The camera control unit according to claim 1,
wherein the camera control unit further comprises a device capable of emitting the geometric position information, the device being provided in each of the one or more objects, and
wherein the position information acquisition unit acquires the geometric position information sent from the device.

7. The camera control unit according to claim 1,
wherein the camera control unit further comprises a second camera that captures the one or more objects, and
wherein the position information acquisition unit detects the one or more objects based on an image from the second camera, and computes the geometric position information of the detected one or more objects.

8. The camera control unit according to claim 1, wherein the position information acquisition unit includes an image receiving unit that receives images from the camera, and an object evaluation unit that evaluates a position of each of the one or more objects within the images received by the image receiving unit using an image recognition technique.

9. The camera control unit according to claim 8, wherein the one or more objects evaluated by the object evaluation unit are humans or faces.

10. A camera image display system comprising:
a camera having a controllable capturing direction and a controllable zoom ratio;
the camera control unit according to claim 1;
a plurality of displays arranged in a continuous manner; and
an image display device operable to divide an image from the camera and display the divided images in the plurality of displays.

11. A camera control method for use in a camera image display system, the camera control method comprising:
a position information acquisition step of acquiring geometric position information of one or more objects captured by a camera having a controllable capturing direction and a controllable zoom ratio;
a capturing area determination step of determining a capturing area of the camera so that the one or more captured objects do not cross a border of any of a plurality of displays and so that all of the one or more captured objects are displayed in the plurality of displays, the capturing area being determined based on the geometric position information acquired in the position information acquisition step, the displays of the plurality of displays being arranged in a continuous manner to form a united display area, and the displays of the plurality of displays being configured to display images obtained by dividing an image captured by the camera so as to maintain a seamless display of the displayed images;
an angle of view/capturing direction computation step of computing an angle of view and a capturing direction of the camera based on the determined capturing area of the camera;
a camera control signal generation step of generating a camera control signal for controlling the camera to conform to the computed angle of view and the computed capturing direction; and
a camera control signal sending step of sending the generated camera control signal to the camera,
wherein the capturing area determination step includes a step of setting a temporary capturing area based on positions of ends of the one or more objects, and a step of setting temporary border lines so that the temporary capturing area is divided into equal divisions.

12. The camera control method according to claim 11, wherein the capturing area determination step includes (i) a step of determining whether or not any object of the one or more objects crosses any temporary border line of the temporary border lines, (ii) a step of shifting a position of the temporary border line crossed by the object, when the object crosses the temporary border line, the position of the temporary border line being shifted so that the object no longer crosses the temporary border line, (iii) a step of shifting remaining temporary border lines, of the temporary border lines, in accordance with the shifted temporary border line, and (iv) a step of finalizing the temporary border lines as border lines of the plurality of displays.

13. The camera control method according to claim 12, wherein the capturing area determination step further includes a step of setting an area between two outermost border lines as the capturing area.

14. A camera control program product that includes instructions for causing a computer to execute the camera control method according to claim 11.

* * * * *